United States Patent
Chon et al.

(10) Patent No.: US 7,441,236 B2
(45) Date of Patent: Oct. 21, 2008

(54) SOFTWARE TEST ENVIRONMENT FOR REGRESSION TESTING GROUND COMBAT VEHICLE SOFTWARE

(75) Inventors: Kumil Chon, San Jose, CA (US); Brian Hamamoto, Pleasanton, CA (US); Kiu Ly, Santa Clara, CA (US); Vincent Phung, San Jose, CA (US); Kien Ly, Milpitas, CA (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 419 days.

(21) Appl. No.: 11/260,508

(22) Filed: Oct. 27, 2005

(65) Prior Publication Data

US 2006/0212540 A1 Sep. 21, 2006

Related U.S. Application Data

(60) Provisional application No. 60/622,560, filed on Oct. 27, 2004.

(51) Int. Cl.
*G06F 9/44* (2006.01)

(52) U.S. Cl. .................................................. 717/135

(58) Field of Classification Search ......... 717/100–104, 717/135; 709/217, 223; 719/313; 702/188, 702/121; 714/724, 703; 705/7, 9; 703/6, 703/20, 23

See application file for complete search history.

(56) References Cited

U.S. PATENT DOCUMENTS

| | | | |
|---|---|---|---|
| 5,157,782 A | 10/1992 | Tuttle et al. | |
| 5,673,387 A | 9/1997 | Chen et al. | |
| 5,694,540 A | 12/1997 | Humelsine et al. | |
| 5,758,062 A | 5/1998 | McMahon et al. | |
| 6,208,955 B1 * | 3/2001 | Provan et al. | 703/20 |
| 6,298,318 B1 * | 10/2001 | Lin | 703/23 |
| 6,795,799 B2 * | 9/2004 | Deb et al. | 702/188 |
| 2002/0150866 A1 | 10/2002 | Perry et al. | |
| 2003/0033374 A1 * | 2/2003 | Horn et al. | 709/217 |
| 2003/0225565 A1 * | 12/2003 | Garcia et al. | 703/23 |
| 2004/0007121 A1 * | 1/2004 | Graves et al. | 89/1.11 |
| 2004/0015315 A1 * | 1/2004 | Kreider | 702/122 |
| 2004/0088602 A1 | 5/2004 | Cohen et al. | |

OTHER PUBLICATIONS

Truitt et al. "Using Open Network Standards Over MIL-STD-1553 Networks", Autotestcon 2004 No. 40, Sep. 2004, pp. 117-123.*
Autotestcon_2004.pdf, pp. 1-2.*
Truitt et al., "Using Open Network Standards Over MIL-STD-1553 Networks", Autotestcon 2004, Sep. 23, 2004, pp. 117-123.

* cited by examiner

*Primary Examiner*—Tuan Anh Vu
(74) *Attorney, Agent, or Firm*—Patterson, Thuente, Skaar & Christensen, P.A.

(57) ABSTRACT

A STE for automated testing of ground combat vehicle software application to validate vehicle software logic provides a system and method to conduct interactive (manual) testing of the vehicle software while under development, record information related to the interactive testing activities, including but not limited to tester inputs and expected outcomes, and perform automated testing of the combat vehicle software application using the recorded information. Preferably, reconfiguration of the STE to support changes that arise due to the evolution of the combat vehicle software application system and the subsystems under control of the evolving software system is provided.

18 Claims, 24 Drawing Sheets

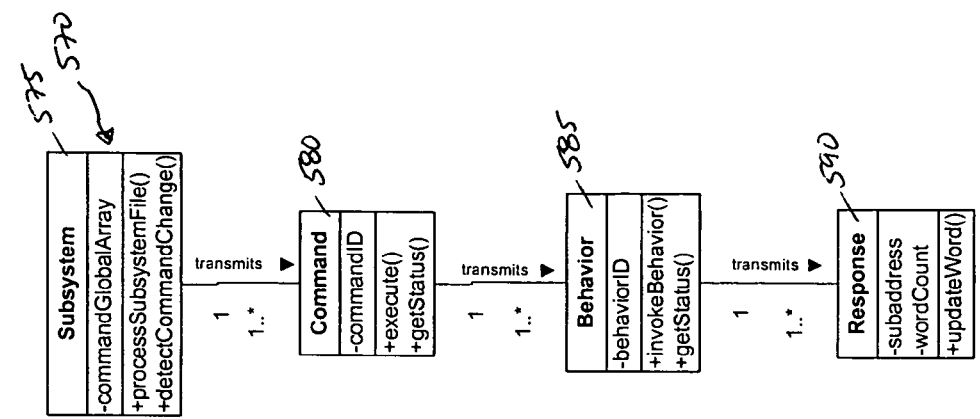
Fig. 20
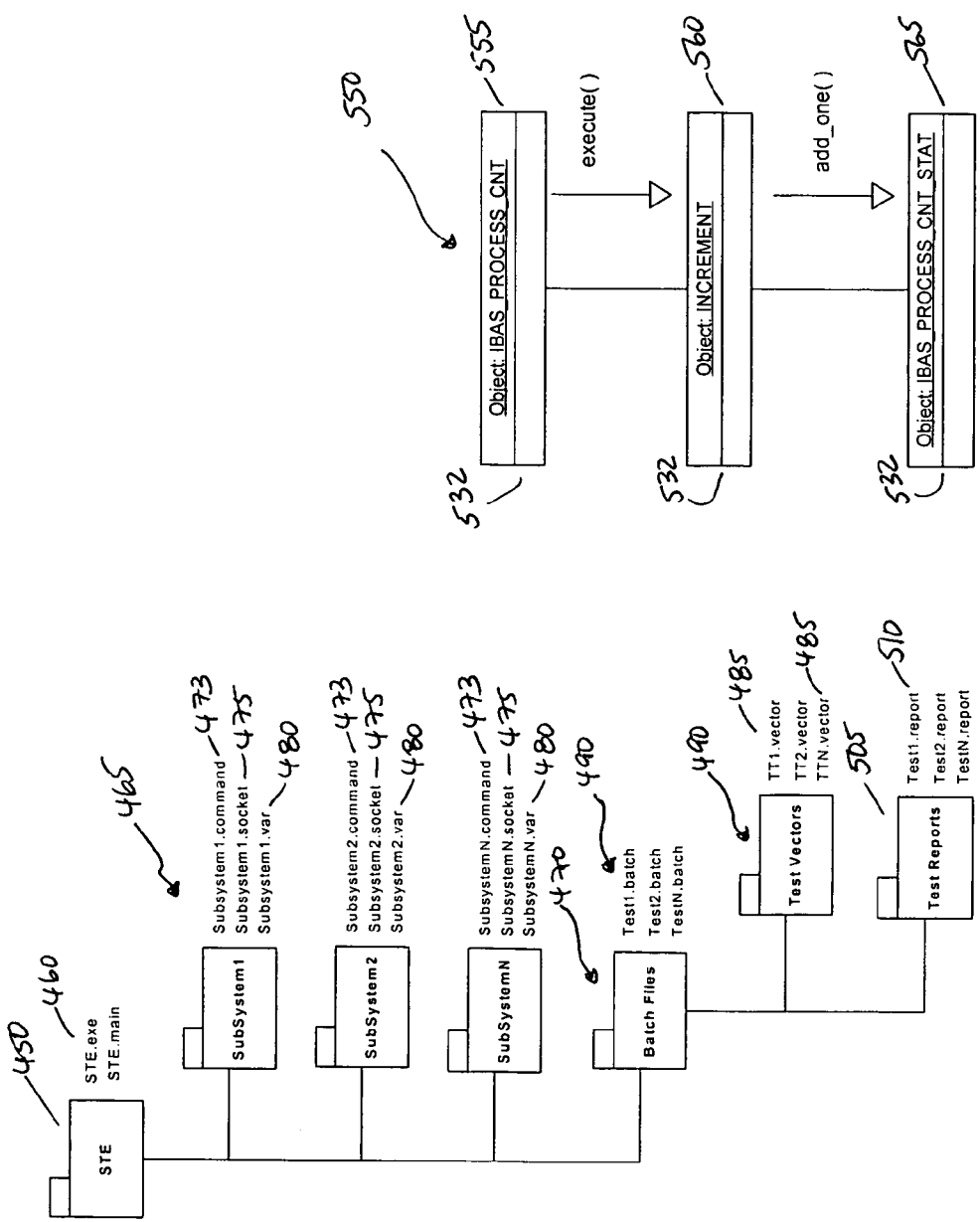
Fig. 19
Fig. 18

SOFTWARE TEST ENVIRONMENT FOR REGRESSION TESTING GROUND COMBAT VEHICLE SOFTWARE

CROSS-REFERENCE TO RELATED APPLICATIONS

The current application claims the benefit of priority from U.S. Provisional Patent Application No. 60/622,560, filed on Oct. 27, 2004, entitled "SOFTWARE TEST ENVIRONMENT", which is hereby incorporated by reference herein.

FIELD OF THE INVENTION

The present invention relates generally to the field of computer simulation of combat vehicle systems. In particular, the present invention relates to a system for facilitating development of complex military ground combat vehicle systems by providing a software test framework to support automated testing and validation of the ground combat vehicle system software application by enabling the simulation and regression testing of test mode interactions between virtual representations of the ground combat vehicle subsystems and the ground combat vehicle system application.

BACKGROUND OF THE INVENTION

The development of complex military equipment traditionally has been based on a rigid, top-down approach, originating with a publication of a customer operational requirements document. The prime contractor decomposes the operational requirements document to allocate requirements at the weapon system level, which in turn are further decomposed and allocated at the subsystem and component level. In terms of system software, this decomposition is reflected at the software component level with components of the software being sourced/developed along the same lines as the procurement of the subsystems and components of the equipment. This top-down, hierarchical approach ensures that customer requirements are reflected in lower-level requirements and become integral to the objective weapon system design.

U.S. Application No. 20020150866 titled "Integrated evaluation and simulation system for ground combat vehicles" details some of the problems encountered by adopting such a rigid top-down approach. One of the problems encountered is that this approach does little to optimally allocate limited resources across a military system design, and objective characteristics of an operational design often exceed program constraints. In addition to sub-optimized designs, the top-down approach often leads to misallocated development resources and development processes that are incapable of rapidly responding to inevitable changes in operational, fiscal, and technological considerations.

Customer recognition of the above-described scenarios, the realities of tight fiscal budgets, and changes in the geopolitical climate during the past decade have had a noticeable effect on how future military systems can be developed and procured. For example, the development of modem military combat systems is cost constrained which could affect a system's capabilities. In addition, most forces are no longer forward deployed, but instead are forward deployable which translates into a need for combat vehicles that are highly agile, versatile and reconfigurable to rapidly adapt to changing battlefield situations. Inevitably, the ground combat vehicle system software that interfaces to and controls the operation of the combat vehicle subsystems is increasingly complex providing expanded capabilities to control weapon aiming and firing, navigation, power management, fault management, and communication. Additionally, once a component or system is deployed on the battlefield it is required to perform reliably and effectively which in turn significantly increases the performance expectations of the combat vehicle software system. This translates into little or no margin for software defects in combat vehicle software systems that are field deployed. Yet, the potential for defective software has increased with the increase in the complexity of the software.

The software development process continues to be dominated by a model in which components of the software are developed by different entities. Although software development processes are improving defect prevention and defect detection, measurement of software quality remains heavily dependent on expensive manual and repetitive software testing. In view of the above discussion, one of skill in the art will appreciate that updates to the combat vehicle software are inevitable, and each update increases the likelihood of software defects.

Prior art software development efforts for military systems have focused on the design aspect of software development. For example, U.S. Patent Application No. 20020150866 referenced above, addresses an evaluation and simulation system that functions integrally and interactively with the conceptualization, design, and development of ground combat vehicles, under conditions whereby design concepts can be analyzed, constrained resources can be allocated across a weapon system architecture in a manner that optimizes the weapon system's combat effectiveness, and a virtual representation of the weapon system can be tested under simulated combat conditions for combat effectiveness. Essentially, the design, analysis, and optimization necessitate the construction, coding and maintenance of complex algorithms to simulate the ground combat vehicles. However, the complexity of the algorithms makes it difficult to update the software that implements the algorithms without inadvertently introducing errors and makes it even more difficult to determine the effect of any introduced error.

Historically, software regression testing is conducted manually. When changes are made to the vehicle software, regression tests must be performed to ensure that the new changes do not produce unintended consequences elsewhere in the system. As vehicle software becomes more complex (in excess of 200,000 lines of code), software testing becomes more labor-intensive, which dramatically increases the cost for software testing activities. As a result, test activities are insufficiently funded which limits software test coverage.

The problem of software testing is exacerbated as development shifts from the waterfall model to the more robust iterative approach. With the waterfall model, regression testing is performed once, prior to the software release. With the iterative approach, regression testing is required after each software build. In complex systems, a software release can have multiple software builds that require multiple regression testing. This compounds the problem of expensive manual software testing. The prior art fails to address the problem of iterative application software testing in the context of complex military systems and subsystems where the yardstick is the reliable operation of the of military system controlled by the application software under battle field conditions.

Another example of software testing is described in U.S. App. No. 20040088602 which is directed to Automated recording and replaying of software regression tests. The application discloses a method and system of regression testing a computer software application in an execution environment wherein the software application interacts with data storages. In an exemplary embodiment, the software application is run a first time and interactions of the software application with the data storage are monitored. For example, the first output data written from the software application to the data storage are recorded, and input data received by the software application from the data storage are recorded. The software application is run a second time after the first time. While running the software application the second time, when the software application calls for data from the data storage, at least a portion of the recorded input data is provided to the software application, and, when the software application writes data to the data storage, second output data written by the software application are recorded. The second output data are compared with the first output data to evaluate whether the software application has passed the regression test. It will become readily apparent to one of ordinary skill in the art that the claimed invention considers output from a static data source instead of multiple, interconnected subsystems. In the latter case, the interrelationship between the responses, including the temporal relationship between the responses, takes on added significance. One of skill in the art would recognize that the regression analysis of the later case would necessarily have to take into account the interaction between the systems which is not necessarily captured by the methodology employed in the aforementioned invention.

Clearly, there is a need for cost effective but reliable software test and validation in a software environment that is becoming increasingly complex and where there is a fundamental shift toward iterative software development processes.

SUMMARY OF THE INVENTION

The present invention addresses the problem of manual software testing for ground combat vehicles in an iterative software development process. A Software Test Environment ("STE") framework is created to support automated regression testing of vehicle software logic. Automation increases software test coverage and helps to contain the increasing software testing cost. To effectively support ground combat vehicle software development, especially with an iterative process, an automated software regression test tool is provided. The present invention provides the capability to accommodate changes to the simulated subsystem interface and behaviors which are inevitable without major recoding and retesting of the STE.

The STE of the present invention supports automated regression testing of vehicle software in development. One of the features of the present invention is that it provides for a minimal set of basic building blocks or primitives to construct a modular behavioral model that simulate the behavior of a wide range of combat vehicle software subsystems for interaction with the combat vehicle software under development may interact with. The modular behavioral models thus constructed behave deterministically in that they respond in an expected manner to a predefined stimulus. Thus, a malfunction of the simulated combat vehicle subsystem response is almost always symptomatic of a deleterious change made to the combat vehicle software application. Therefore, the basic building blocks provide the same functionality as the behavioral models of combat vehicle subsystems that use complex algorithms and require extensive, error-prone coding but without the complexity and attendant unreliability of the software implementations required to use the behavioral models.

The vehicle software and the STE may execute on separate processors and under very different operating system environments. The STE simulates the vehicle software external subsystems and communicates with the vehicle software via an Ethernet interface. The STE provides a graphical user interface for the tester to stimulate inputs to the vehicle software and monitor the vehicle software outputs to the vehicle subsystems. Once a test sequence is successfully conducted with the STE, the tester can record the test vectors. The test names of the recorded test vectors are included in a batch test file to support automated batch regression testing. After a batch regression test is performed, a pass/fail test report is created for each recorded test vector. The STE provides a framework so that the simulated vehicle software external subsystems can be customized for different vehicle software development needs. The system is flexible enough to allow the addition and removal of simulated subsystems. Simulated subsystem interface and behavior is adaptable.

The STE framework includes the following major software functions: a) provides testers with user interface panels to inject inputs to the vehicle software, b) provides simulated subsystem response to commands received from the vehicle software, and c) provides the capability to record and replay a test case including the ability to analyze the interrelationship between responses from interconnected subsystems and exposition of temporal dependencies.

The STE graphical user interface (GUI) allows testers to select inputs to the vehicle software and to display vehicle software outputs to the simulated subsystems. Operator inputs are processed and transmitted to the vehicle software via Ethernet. Vehicle software outputs to simulated subsystems are also processed and displayed on the STE GUI. Each GUI element is associated with one or more simulated subsystems. To keep the framework easily expandable, most simulated subsystems are table-driven. Simulated subsystems can be added with a modified GUI and associated table simulating the subsystem inputs and outputs. An input from a table activated from a GUI event can be transmitted from the Simulated Subsystem Module to the vehicle software. Similarly, a response from the vehicle software can be processed in a table in the Simulated Subsystem Module for display on the GUI panel. More complex subsystems are coded with the appropriate logic to properly process the command or status between the GUI, subsystem and vehicle software.

The STE is equipped with a record and replay mechanism so that regression tests can be performed using the replay feature. During a record session, the tester mouse-clicks the GUI elements that he wants to test. The record/replay Module captures the command or status of these mouse-clicked GUI elements. After a record session is complete, a test script is created and stored in a database. When the test script is selected for replay, the record/replay Module sends commands from the test script to the GUI panel automatically as if the tester was performing the action. After the vehicle application processes these signals and sends its response back to the appropriate subsystems, the subsystem responses are displayed on the GUI panels. The record/replay Module dynamically compares the replayed GUI status to the recorded GUI status to determine pass/fail checkpoints in the automated test script. The test scripts can be run every time there is a change to the vehicle application to ensure that the change has not introduced new defects in the system. The STE provides the tester with the capability to record test sequences of the manual testing steps including input and/or outputs via the GUI panel. The STE allows the tester to replay the recorded steps automatically by specifying a batch test file. During replay, the STE generates a test report file containing pass/fail test results.

BRIEF DESCRIPTIONS OF THE DRAWINGS

FIG. 18 is an illustration of the STE Directory Hierarchy;

FIG. 19 depicts an exemplary object structure using the Command Pattern;

FIG. 20 is an illustration of a Class Diagram structure of a Subsystem;

DESCRIPTION OF THE PREFERRED EMBODIMENT

Figure 1:
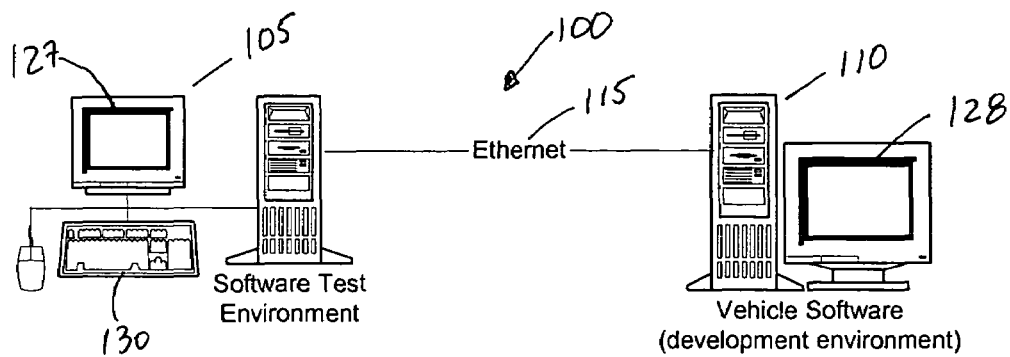
FIG. 1 is an illustration of a software test environment configuration (STE)

FIG. 1 illustrates a system configuration 100 used for developing, testing and running a software environment exemplary of the present invention. System configuration 100 includes a test computer 105 coupled to an application computer 110 through a data link 115. The test computer 105 is adapted to host a Software Test Environment (STE) (illustrated in FIG. 3 as reference numeral 120) in accordance with the present invention. The application computer 110 is configured to provide a development and optionally a production environment for application software (illustrated in FIG. 3 as reference numeral 125). In an exemplary embodiment, the test computer 105 is a personal computer (PC) running, for example, a commercially available operating system such as Windows XP, which is available from Microsoft Corporation. The application computer 130 runs a development/production environment under, for example the UNIX operating system. UNIX is a registered trademark of The Open Group. An object oriented programming system such as Java™ may run in conjunction with each of the operating systems and provide calls to the operating systems from Java programs or applications executing on both the test computer 105 and the application computer 110. Java is a registered trademark of Sun Microsystems, Inc.

The application computer 110 and test computer 105 communicate via the data link 115 which may comprise, for example, an Ethernet connection 135 utilizing standard TCP/IP protocols. As will be readily apparent to one of skill in the art, the carpal plate 30, combat CVS 125 could represent any system under development or in production that controls other physical or virtual subsystems whose operation may be potentially affected by any change to the application software.

The STE 120 could physically be implemented on the application computer 110. Likewise, the application computer 110 and the test computer 105 may be nodes on a communication network operating in a client-server mode and communicating via one of several standard communication protocols, such as for example, SONET (Synchronous Optical NETworking), ATM (synchronous Transfer Mode), and IP (Internet Protocol version 4). The test computer 105 may include a STE display 127 and STE user input device 130.

Figure 2:
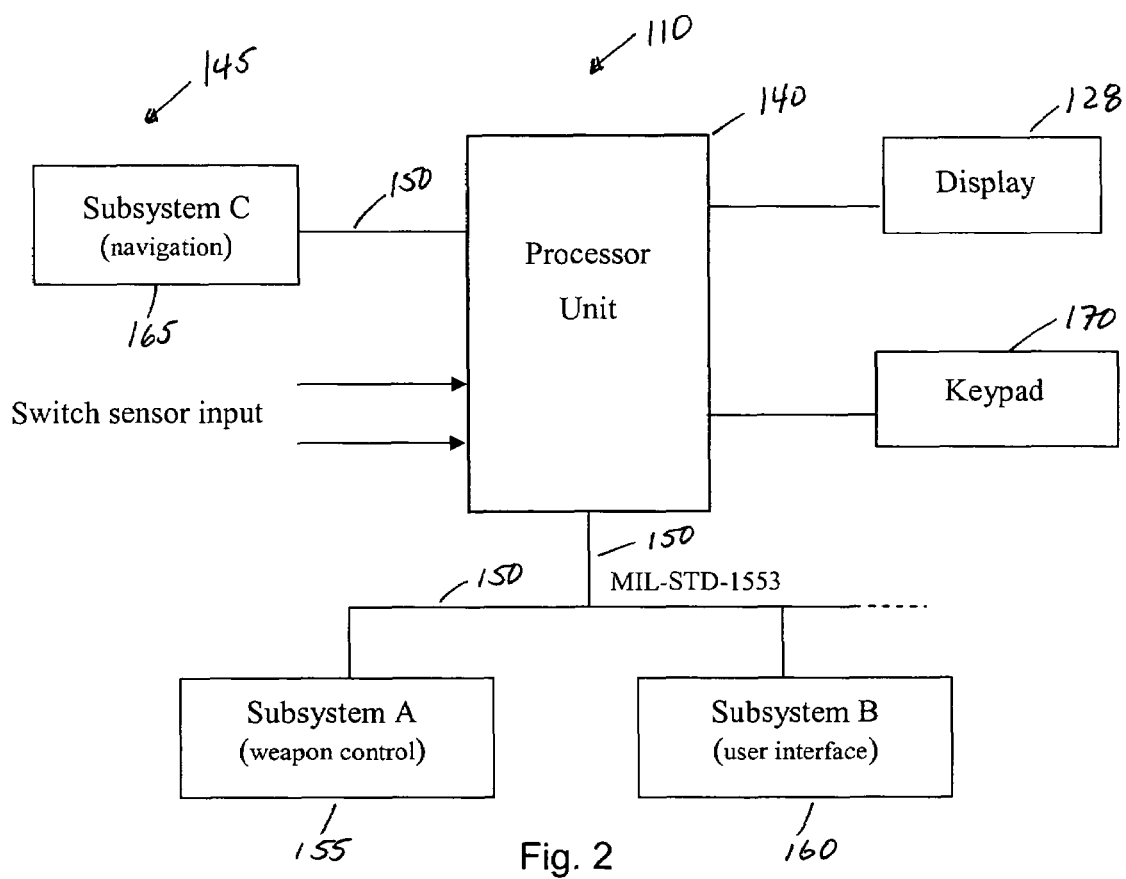
FIG. 2 is a block diagram of an exemplary architecture of combat vehicles.

FIG. 2 illustrates an exemplary architecture of the application computer 110. Application computer 110 includes Central Processing Unit (CPU) 140 operably connected for information communication with one or more subsystems 145 via an information channel 150. In the exemplary architecture of FIG. 2, CVS 125 may be a CVS 125 under development or in production. Likewise, the subsystems 145 may be physical or virtual subsystems of a combat vehicle system whose operation is wholly or partially controlled by the CVS 125.

The CVS 125 comprises complex, machine-readable software coded for execution by the Central Processing Unit (CPU) 140 to control the various subsystems 145 in the vehicle. As can be seen in the illustration of FIG. 2, vehicle subsystems 145 may include weaponry 155, user interfaces 160, navigational systems 165, and switch sensor inputs 170.

Thus, the application software 125 of the present invention, (i.e. the CVS), communicates with the vehicle subsystems 145 to control, for example, weapon aiming and firing, navigation, power management, fault management, and communication. An important feature of the present invention, as will be described in greater detail in the succeeding paragraphs, is that the STE 120 includes software simulated versions of the vehicle subsystems 145 interfaced with the CVS 125 to enable software regression analysis of the CVS 125 at any stage of its development. In the description that follows, the terms vehicle subsystems and simulated subsystems are used interchangeably. Likewise, the term application software is used interchangeably with the term vehicle software. Changes made to the CVS 125 during development may necessitate changes to the simulated subsystems 145. The STE 120 of the present invention provides the capability to add and remove simulated subsystems as well as the ability to extend and adapt the subsystem interface and behavior to a new configuration of the application software 125. A display 128 and a keypad 170 provide a user interface for input and output of data to the CPU 140 if desired. The Computer System 100 of the present invention is based on an extensible architecture to facilitate changes to the STE 120 framework. To keep the framework easily expandable, subsystems 145 are generally table-driven and operate in conjunction with an interface control document (ICD) and a graphical user interface (GUI) component associated with each simulated subsystem 145 as will be explained in detail in the following paragraphs. Simulated subsystems 145 can be added with a modified GUI and associated table simulating the subsystem inputs and outputs. An input from a table activated from a GUI event can be transmitted from the Simulated Subsystem Module to the vehicle software. Similarly, a response from the vehicle software can be processed in a table in the Simulated Subsystem Module for display on the GUI panel. More complex vehicle subsystems will be coded with the appropriate logic to properly process the command or status between the GUI, the vehicle subsystem and the vehicle software.

In the exemplary embodiment illustrated in FIG. 2, the information channel 150 is a MIL-STD-1553B ("1553") data bus that forms the primary communication link between the CPU 140 and the vehicle subsystems 145. It will be appreciated by one of skill in the art that the vehicle subsystems 145 may be configured to communicate on other well-known data buses such as RS232 or SCSI. It will also be evident to one of skill in the art that the application software 125 embodied in the CVS 125 and the attendant subsystems 145 are generally external to the STE 120.

The design and implementation of the high level software architecture of the STE 120 is best understood in the context of the "4+1 View Model" well known in the art. The "4+1" view model comprises five concurrent views, which are the logical view, the development view, the process view, the physical view, and the scenarios (use cases). Those of skill in the art will recognize that these views are alternate descriptions and representations of the software architecture. The description of the present invention is organized around three of the five architectural views namely the logical view, the development view, and the scenarios. The logical view decomposes the functional requirement into a set of key abstractions in the form of objects or object classes to expose the design's object model according to the object-oriented programming methodology adopted for implementation of the STE 120. This view also serves to identify common mechanisms and design elements across the system. The development view focuses on the actual software Module organization. The entire software is packaged into subsystems, which are organized in a hierarchy of layers. Each layer has a well-defined responsibility, and subsystem can only depend on subsystem within the same layer or in layers below to minimize complex dependencies between software Modules. The description of the architecture is illustrated with selected use cases, or scenarios, which validate the completeness and inner working of the logical view and development view.

FIGS. 3-10 illustrate a high-level software Module organization through functional block diagrams and flow diagrams of an exemplary implementation of the software architecture consistent with the present invention. The blocks denote software architectural constructs that may be implemented with logic. One of skill will appreciate that the present invention is not limited either by the number of blocks or by the order of occurrence of the blocks.

Figure 3:
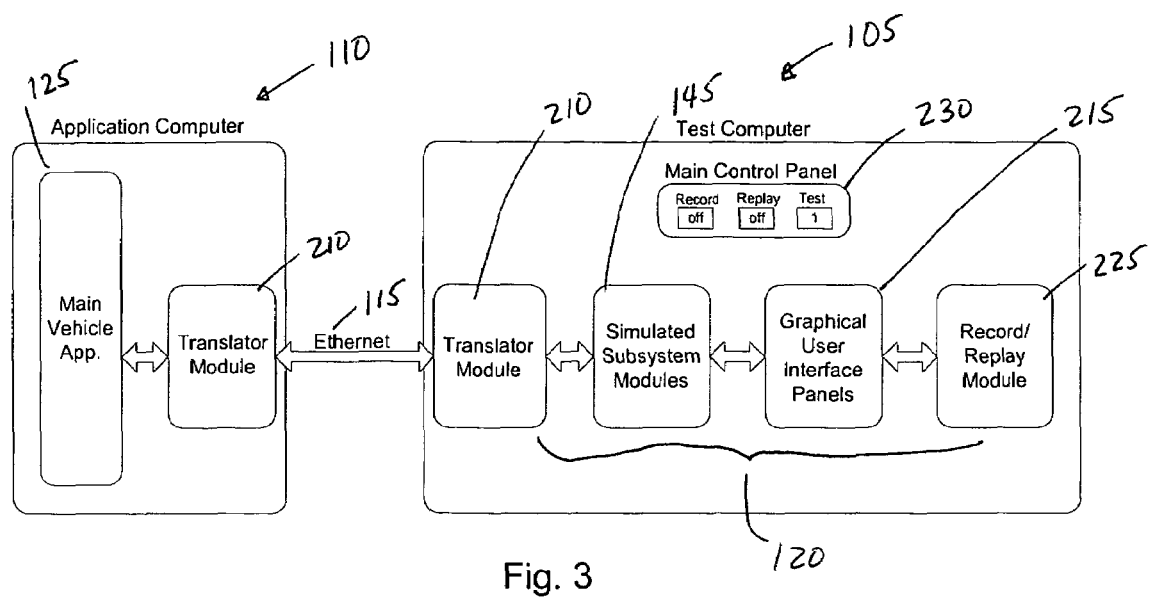
FIG. 3 is a functional block diagram of an exemplary software test environment.
Figure 4:
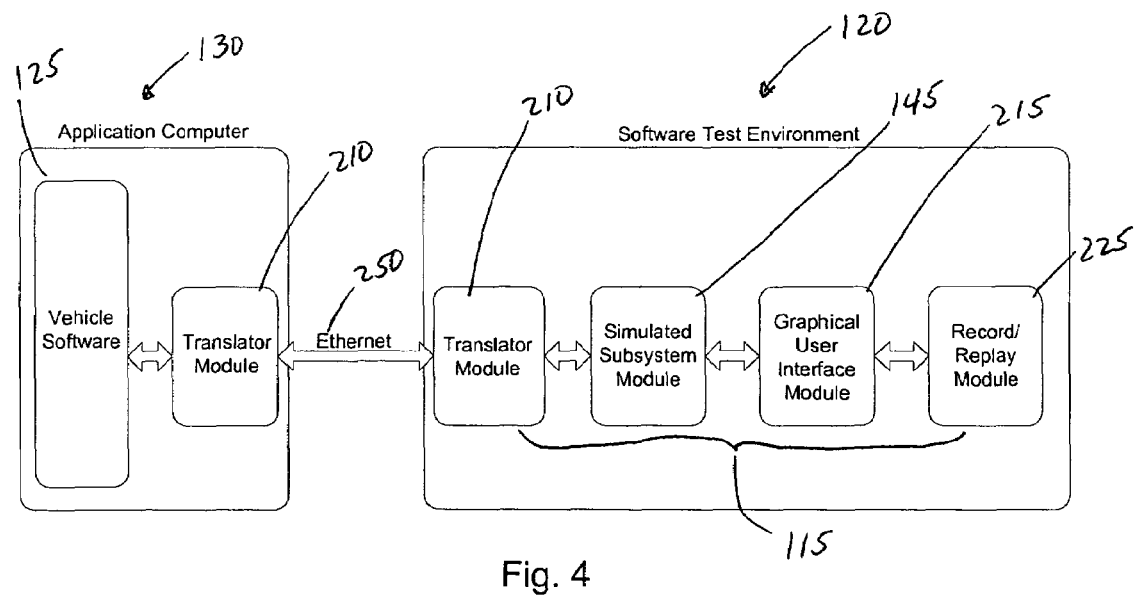
FIG. 4 is an illustration of a system architecture model.

Referring now to FIGS. 3 and 4, details of the STE framework are presented first in the form of a functional block diagram of FIG. 3 and second as a system architectural model of FIG. 4. As can be seen in FIGS. 3 and 4, the application computer 110 hosts two Modules—the main CVS 125 and a first component 240 of the Translator Module 210. The test computer 105 hosts the STE 120 comprising a third component 245 of the Translator Module 210, a graphical user interface (GUI) 215, at least one Simulated Subsystem 145, and a Record/Replay Module 225. A Tester Module 230 abstracts the manual interactions with the STE 120 and encapsulates them into a software functional modular component of the STE 120. A third component 250 of the Translator Module 210 serves as the Ethernet Interface between the application hosting computer 130 and the test computer 120.

Figure 5:
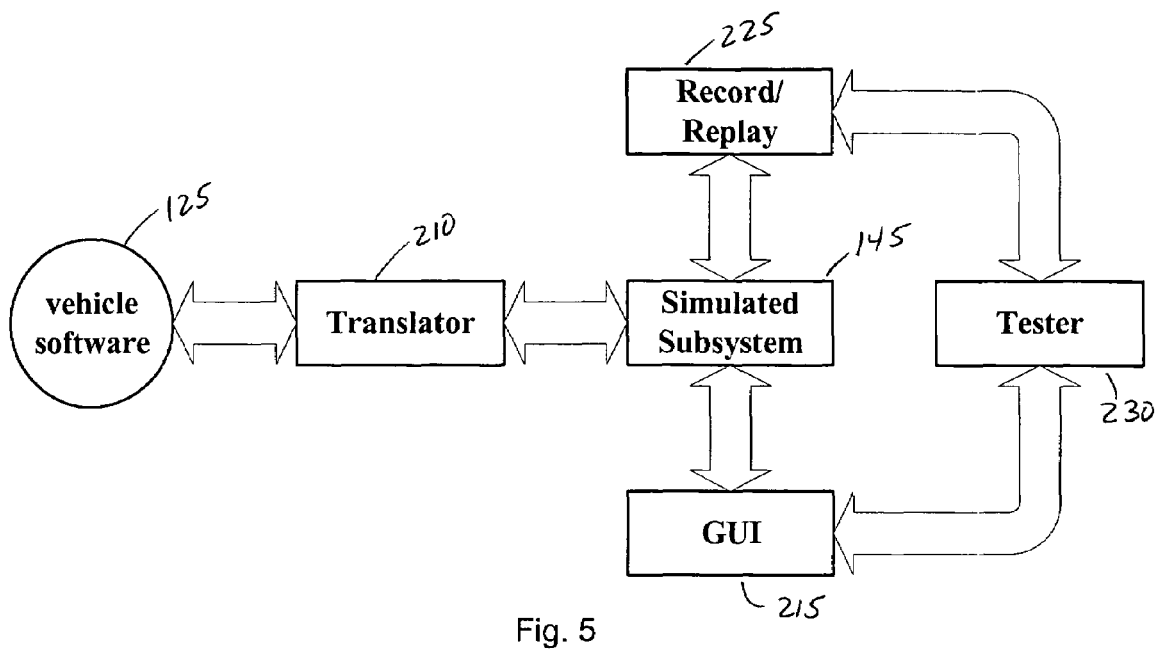
FIG. 5 is a Module flow diagram of the software test environment configuration (STE)

FIG. 5 is a schematic representation of the data flow diagram of the STE 120 of the present invention. Data received from the CVS 125 consists of TCP/IP command data packets. The commands in the TCP/IP data packets are translated and sent to the Simulated Subsystems 145. Status/tester stimulus received from the Simulated Subsystem 145 is translated and formatted into TCP/IP status data packets, which are sent to the CVS 125. It must be noted that the Tester Module 230 interacts, i.e. originates input to and processes output from, indirectly with the Simulated Subsystem 145 via the Record/Replay Module 225 and the GUI 215. Details of each of the functional Modules of the STE 120 will be presented next.

Figure 6:
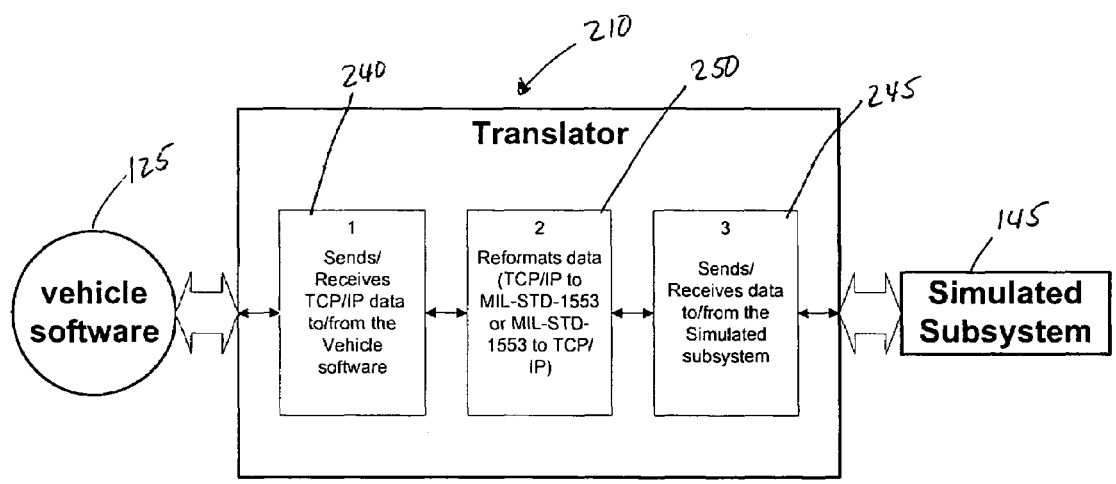
FIG. 6 is a Translator Module Flow Diagram.

Turning now to FIG. 6, details of the Translator Module 210 are shown. Translator Module 210 includes three functional components referenced above. Generally, the Translator Module 210 provides the gateway/interface for data transmission between the STE 120 and the CVS 125. The Translator Module 210 functions to send/receive, to encode/decode Ethernet messages and to configure the Ethernet addresses. The Translator Module 210 is active when the STE 120 sends or receives data from the CVS 125. The first component 240 of Translator Module 210, establishes TCP/IP communication between the application hosting computer 130 and the test computer 120. The Translator Module 210 receives or sends TCP/IP data packets from the external system interface (not shown) through an Ethernet port on the test computer 120. The local port number will be assigned for each Simulated Subsystem 145. The second component 250 converts the TCP/IP packets to MIL-STD-1553 format that specifies the remote terminal number, sub-address, word count and data words or converts the MIL-STD-1553 formatted data to TCP/IP data packets with the appropriate headers specified in the external system interface section (not shown). The third component 245 sends or receives the MIL-STD-1553 data to/from the Simulated Subsystem 145. In one embodiment, each Simulated Subsystem 145 is associated with a subsystem Interface Control Document (ICD) that is configured to encode/decode the commands and responses that pass through the Simulated Subsystem 145. Translator Module 210 is equipped with internal tables to help determine the context of the data passed between the test environment and the vehicle application based on these Interface Control Documents (ICD).

Figure 7:
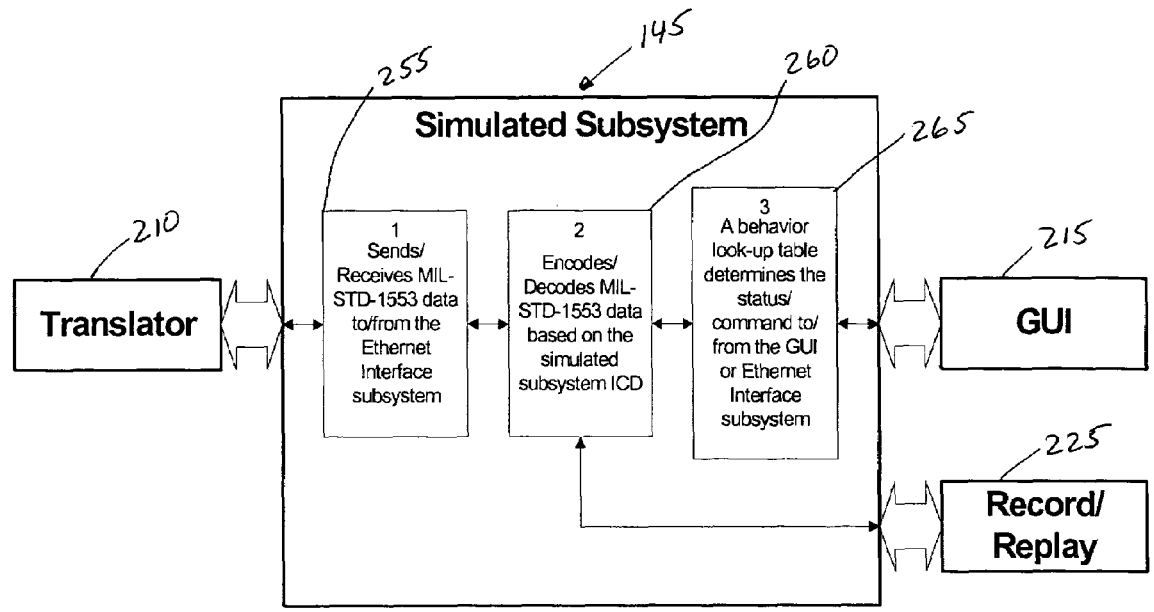
FIG. 7 is a Simulated Subsystem Module Flow Diagram.

FIG. 7 provides a schematic of the Simulated Subsystem Module 145. The Simulated Subsystem Module 145 functions to decode the commands from the vehicle software and determine a response based on the Simulated Subsystem ICD (not shown). The response is encoded into a MIL-STD-1553 format and sent to the CVS 125 via the Translator Module 210. The response can also be sent to the GUI Module 215 for display. The Simulated Subsystem Module 145 also receives an input from the GUI Module 215, encodes the input into MIL-STD-1553 format and sends the data to the Translator Module 210 to stimulate the CVS125. The Simulated Subsystem Module 145 is active when the STE 120 sends or receives data from the Translator 210 or GUI Modules 215. As seen in FIG. 7, the Simulated Subsystem Module 145 has three functional components. The first Simulated Subsystem Module component 255 sends or receives MIL-STD-1553 data to and from the Translator Module 210. The second Simulated Subsystem component 260 provides the decoder/encoder for the MIL-STD-1553 formatted data. An ICD for each Remote Terminal is used to decode or encode each message that passes through this Module. The second Simulated Subsystem Module component 260 sends the decoded data to the first Simulated Subsystem Module component 255 for formatting into an Ethernet message and sends the encoded data to the third Simulated Subsystem Module component 265 for a response. However, if RECORD mode is enabled, the second Simulated Subsystem component 260 sends the encoded data to the Record/Replay Module 225 for recording. Details of the Record/Replay Module 225 are provided in a subsequent section of this description. The second Simulated Subsystem component 260 is also configured to receive an input from the Record/Replay Module 225. Upon receiving such an input, the component encodes it into MIL-STD-1553 format, and sends it to the first Simulated Subsystem component 255. The third Simulated Subsystem component 265 determines a response to the command words based on the Simulated Subsystem ICD. This component then sends the response to the GUI Module 215 and/or sends the status to the second Simulated Subsystem component 260 for encoding. The third Simulated Subsystem component 265 receives an input from the GUI Module 215, determines the response, and sends the response to the second component 260 for encoding. The third component 265 also receives input data from the Record/Replay Module 225 that requires the same processing as the input from the GUI Module 215.

Figure 8:
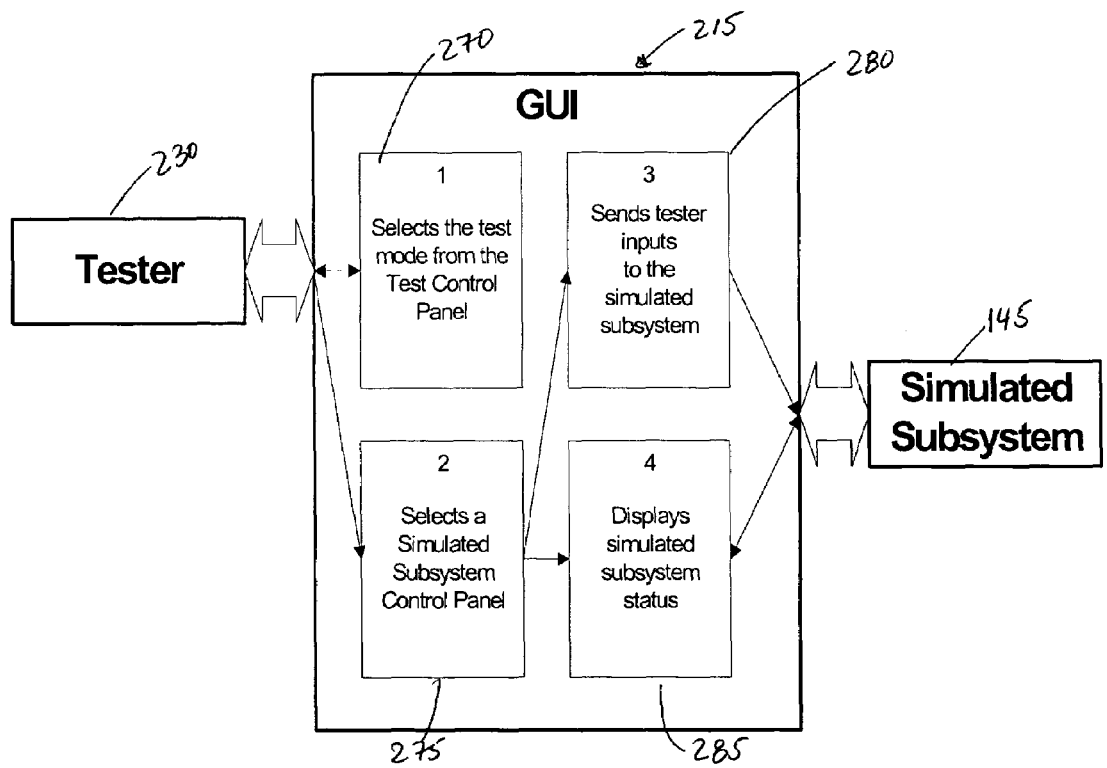
FIG. 8 is a Graphical User Interface (GUI) Module Flow Diagram.

FIG. 8 illustrates a GUI Module according to one embodiment of the present invention. The GUI Module 215 provides the tester with a GUI panel (not shown) for test mode selection. For example, the GUI Module 215 may display toggle switches, radio buttons, user text fields checkboxes, LEDs and labels on the STE screen display (not shown in FIG. 6). The GUI subsystem can be executed in three modes: MANUAL, RECORD, or REPLAY. The GUI subsystem is active when the STE 120 is executed. As depicted in FIG. 8, the GUI Module 215 comprises four functional components. The first GUI component 270 provides the tester with a GUI panel for test mode selection. It displays toggle switches, radio buttons, user text fields, checkboxes, LEDs and labels. The second GUI component 275 provides the tester with GUI panels for Simulated Subsystem 145 selection. The tester can select multiple subsystems from this GUI panel. The tester then uses the subsystem GUI panels to generate a number of different test stimuli to the Simulated Subsystem 145. The third GUI component 280 displays the Simulated Subsystem control panel with various GUI objects for tester inputs. This component translates and packages the tester inputs into a message, and sends the message to the Simulated Subsystem 145. The fourth GUI component 285 displays the Simulated Subsystem status. This component accepts the tester input and the Simulated Subsystem response, and displays the appropriate status on buttons, labels, and LEDs, for example, for the tester to validate the input and the result.

Figure 9:
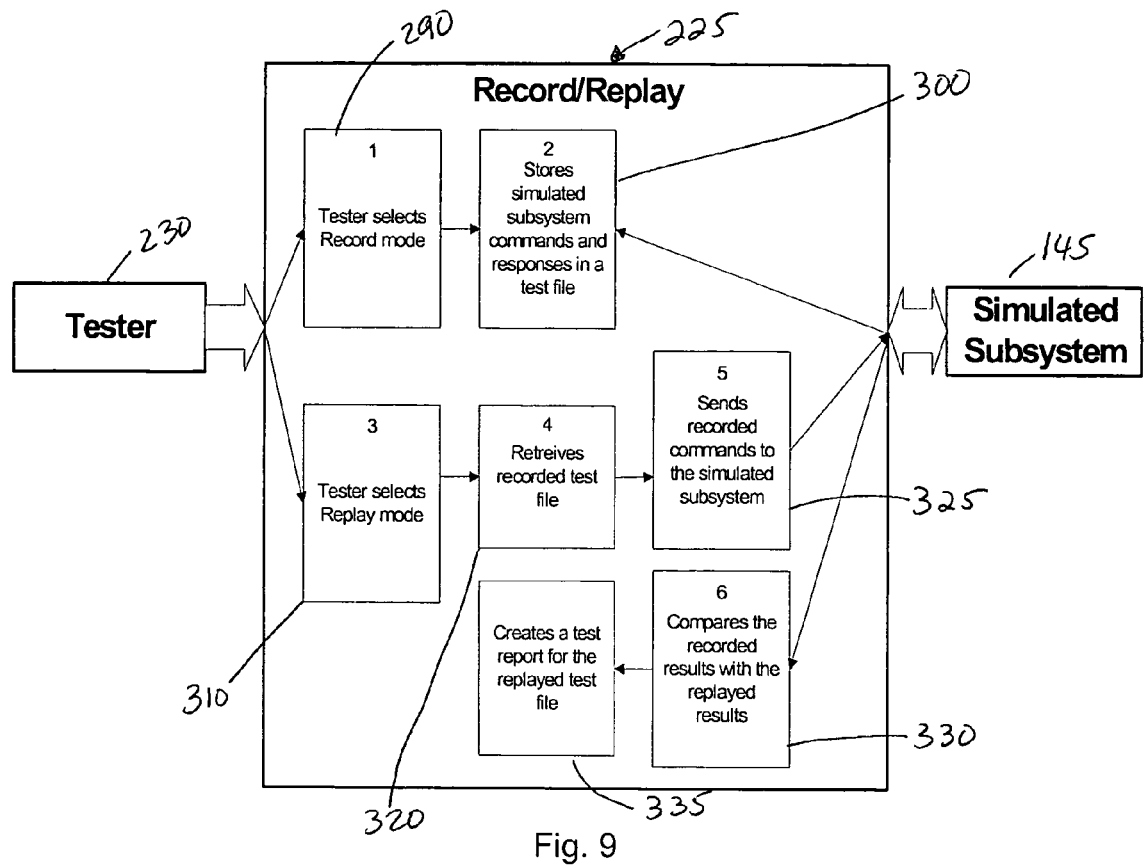
FIG. 9 is a Record/Replay Function Flow Diagram.

FIG. 9 illustrates the Record/Replay Module 225. The Record/Replay Module 225 provides record and replay capabilities for test cases. In RECORD mode, the Record/Replay Module 225 stores the Simulated Subsystem commands and responses in a test file. In REPLAY mode, the Record/Replay Module 225 replays a recorded test case. The recorded commands are sent to the Simulated Subsystem Module 145 for replay stimulation of the CVS 125. The Simulated Subsystem 145 sends the Record/Replay Module 225 the associated responses to the commands and dynamically compares the recorded responses to the replayed responses. The Record/Replay Module 225 creates a test report based on the compared results. The Record/ Replay Module 225 is active only when the STE 120 is in RECORD or REPLAY mode. Otherwise, no calls are made to any objects of this Module. In one embodiment of the present invention illustrated in FIG. 9, the Record/Replay Module 225 includes seven functional components. The first record/replay component 290 confirms that RECORD mode has been activated by the Tester Module 230. It opens a file in the test case directory based on the specified name from the Tester Module 230 to store the commands and responses from the Simulated Subsystem 145. If another mode is chosen or RECORD mode is terminated, the first record/replay component closes the file. The second record/replay component 300 stores the Simulated Subsystem 145 commands and responses in the opened file from the first record/replay component 290. It provides the table structure for the recorded commands and responses from the Simulated Subsystem 145. The third record/replay component 310 confirms that REPLAY mode has been activated by the Tester Module 230. The fourth record/replay component 320 is associated with test files. There are two types of test files associated with this component, a batch test file and a test case file. The batch test file contains test case filenames; the test case file contains the recorded commands and responses from a manual recorded test. The fourth record/replay component 320 retrieves the batch test file according to the tester's input, opens the file, and stores the test case filenames in memory. This component retrieves the first test case file from the test case directory and stores the commands and responses in an array. It transfers the entire command/response array to the fifth record/replay component 325 and the sixth record/replay component 330. When the fifth record/replay component 325 indicates that it has completed its task, the fourth record/replay component 320 closes the test case file and retrieves the next test case file. This process continues until all test case files listed in the batch test file have been replayed. The fifth record/replay component 325 sends the recorded subsystem commands to the Simulated Subsystem 145. If a command is associated with a response, the fifth record/replay component waits until the sixth record/replay component receives the response before it sends the next command. This process continues until all commands are sent to the Simulated Subsystem 145. The fifth record/replay component 325 signals both the fourth 320 and theسixth 330 record/replay components when it has completed replaying the test case. The sixth record/replay component 330 uses the command/response array from the fourth record/replay component 320 to compare the recorded responses with the responses received from the Simulated Subsystem 145. It sends the seventh record/replay component 335 pass/fail results for each test case in the batch test file. The seventh record/replay component 335 receives pass/fail results for each test case from the sixth record/replay component. From these results, it creates a test file report. If the test case passes all test steps, a pass for the test case is reported. If there are any failed steps, the test report will specify the test step associated with the test case in the report.

Figure 10:
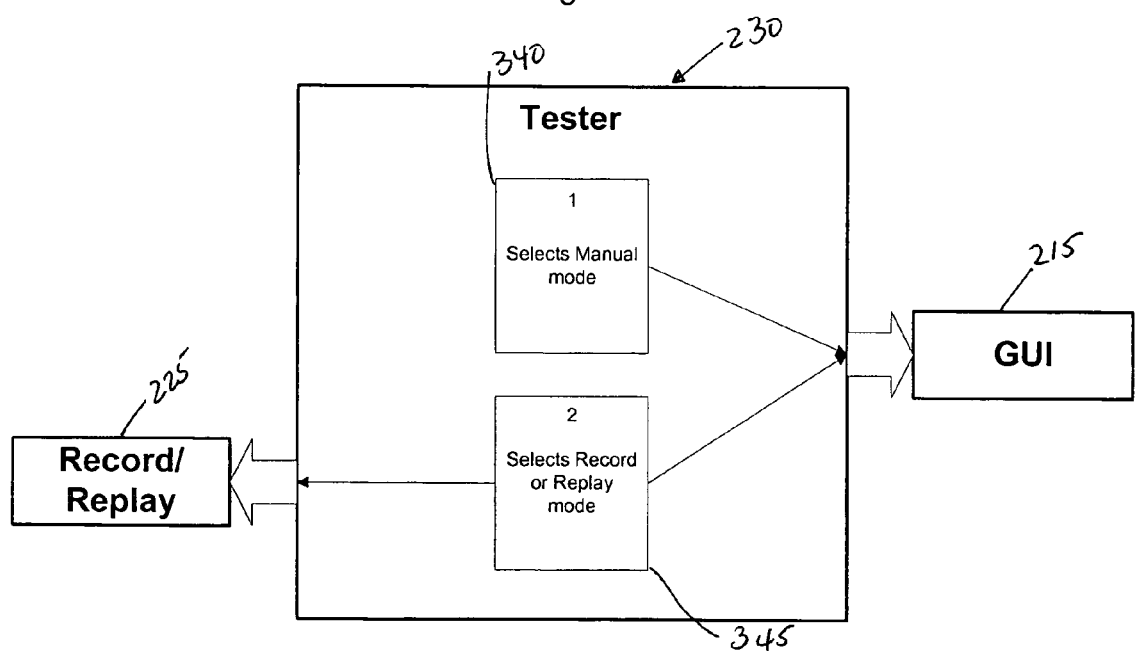
FIG. 10 is a Tester Module Flow Diagram.

FIG. 10 is a schematic representation of the Tester Module 230 including its two functional components. The Tester Module 230 selects the test mode from the tester GUI panel 215. In MANUAL mode, the Tester selects the desired GUI panel 215 objects and observes the responses from the CVS 125. In RECORD or REPLAY mode, the Tester Module 230 sends the test mode to the GUI panel 215 and Record/Replay Modules 225 so that these Modules can process the appropriate information. The Tester Module is active only when the STE 120 is executed. The first Tester Module component 340 selects the manual test mode and sends the initialization command to the GUI panel 215. The second Tester Module component 345 selects either the record or replay mode. This component sends the selected test mode to the GUI panel 215 and the Record/Replay Module 225.

Figure 11:
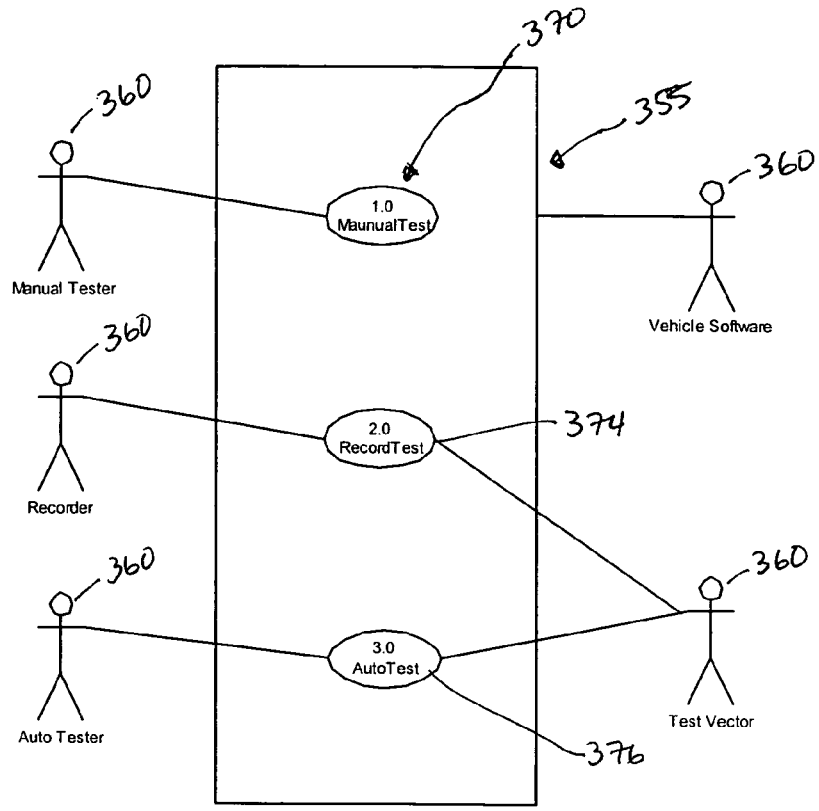
FIG. 11 is an illustration of the User-Cases according to an embodiment of the present invention.
Figure 12:
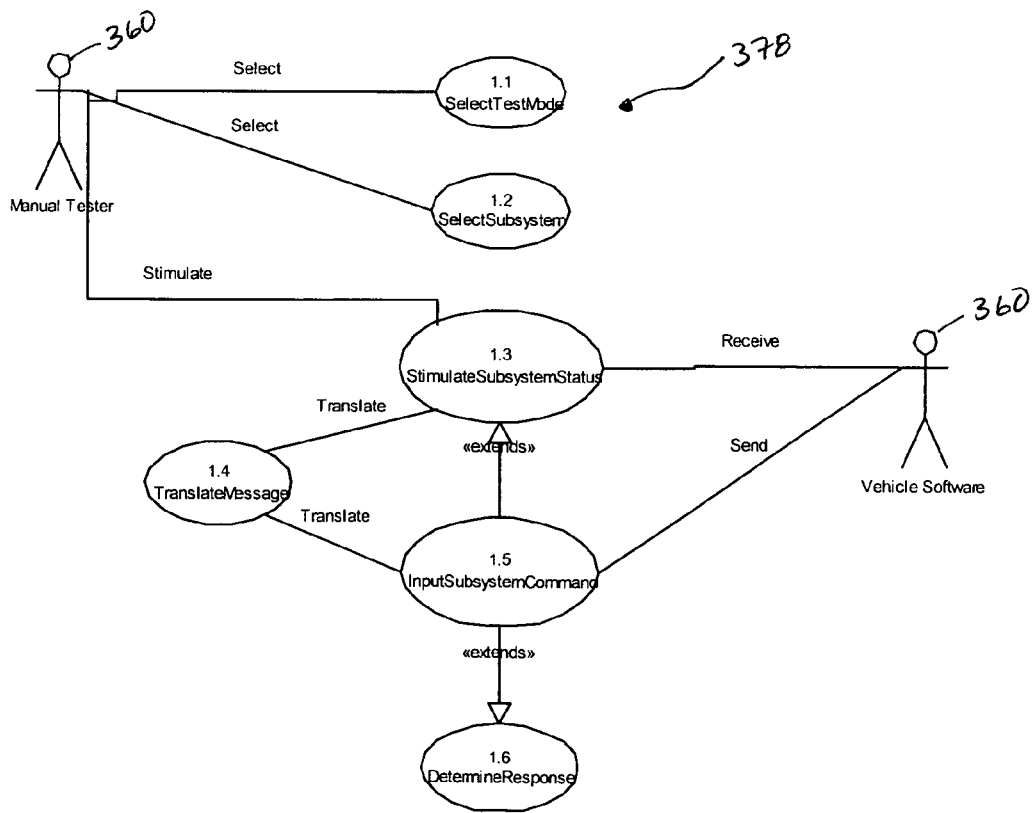
FIG. 12 is a Use Case for Manual Test.
Figure 13:
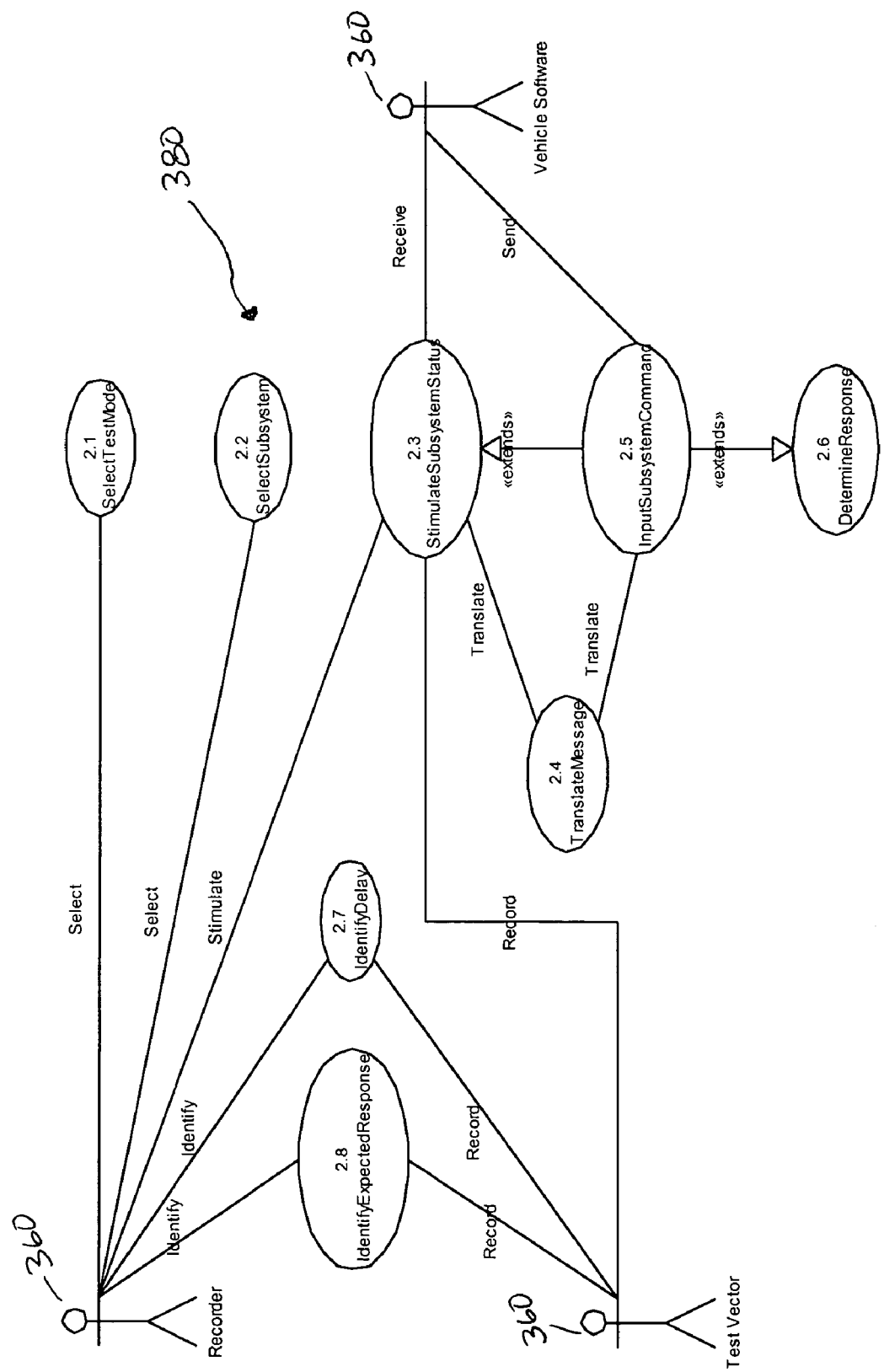
FIG. 13 is Use Case for Record Test.
Figure 14:
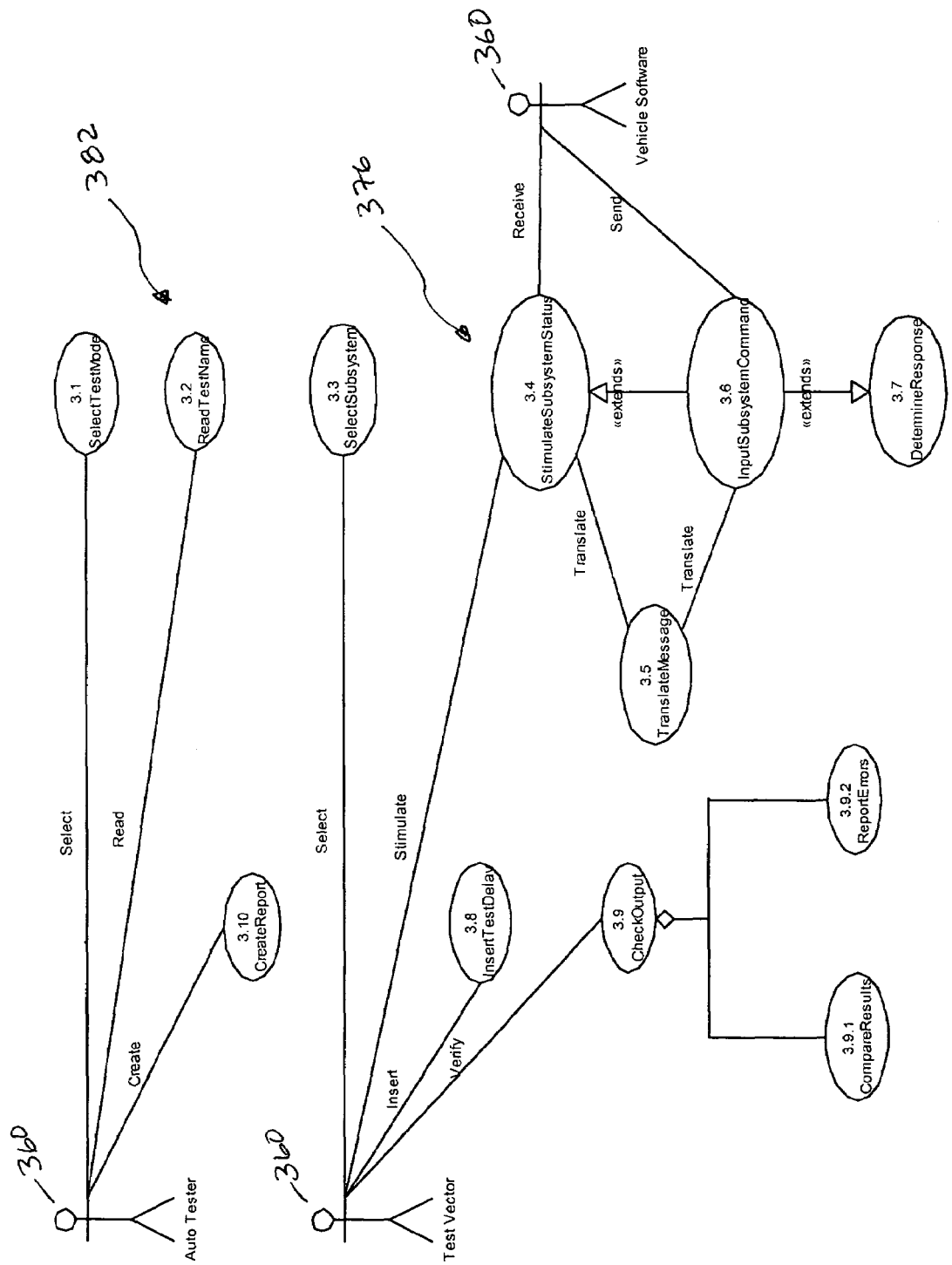
FIG. 14 is a Use Case for Auto Test.

Now a concurrent view of the STE 120 of the present invention will be described with reference the use case diagrams or scenarios depicted in FIGS. 11-14. A use case is a sequence of steps or a process by which the "external" actors interact with the STE's and the STE interacts with the outside world. The use case diagram of the STE 120 maps the interaction between "external" actors and use cases to accomplish a specific goal. FIG. 11 illustrates a main use case diagram 355 depicting the interaction between actors 360 and the STE 120 through use cases 370. The STE has three use cases: Manual Test 372, Record Test 374 and Auto Test 376. FIGS. 12-14 illustrate subordinate use cases that detail the sub processes 378, 380 and 382 implicit in the processes comprising each of the three use cases 372, 374 and 376 respectively. Tables 1-27 list exemplary use cases corresponding to the STE 120 of the present invention.

TABLE 1

Manual Test Case
Use Case ID # 1; Use Case Title: Manual Test Case

The Manual Tester runs the Software Test Environment (STE) executable.
The Manual Tester logs into the STE.
The Manual Tester selects the MANUAL test mode from the Test Panel.
The Manual Tester selects the component name from the Test Panel.
The selected Component Panel appears on the computer display.
The Manual Tester chooses commands on the Component Panel.
The commands from the Component Panel are parsed and sent to the Vehicle Software.
The Parser parses a Command message to the Vehicle Software.
The Parser uses the Interface Control Document (ICD) to decode the message.
The Parser parses a Response message to the Vehicle Software
The Parser uses the component ICD to encode the message.
The Vehicle Software sends a Command to the chosen Vehicle Component.
The Command is parsed into a signal name.
The Response from the signal name is determined.
The Response is sent to the Component Panel for display.
ALTERNATIVES listed in the sub use cases presented below

TABLE 2

Select Test Case
Use Case ID #1.1 Use Case Title: Select Test Mode

The Manual Tester runs the Software Test Environment (STE) executable.
The Manual Tester logs into the STE.
The Manual Tester selects the MANUAL test mode from the Test Panel.
ALTERNATIVES listed in the sub use cases presented below

TABLE 3

Select Subsystem Panel
Use Case ID #1.2 Use Case Title: Select Subsystem Panel

The Manual Tester selects the component name from the Test Panel.
The selected Component Panel appears on the computer display.
ALTERNATIVES listed in Use Cases 1.1 and 2.1

TABLE 4

Stimulate Subsystem Status
Use Case ID #1.3 Use Case Title: Stimulate Subsystem Status The Manual Tester chooses commands on the Component Panel.
The commands from the Component Panel are parsed and sent to the Vehicle Software.
ALTERNATIVES listed in Use Case 2.1

TABLE 5

Translate Message
Use Case ID #1.4 Use Case Title: Translate Message

The Parser parses a Command message from the Vehicle Software.
The Parser uses the Interface Control Document (ICD) to decode the message.
The Parser parses a Response message to the Vehicle Software
The Parser uses the component ICD to encode the message.
ALTERNATIVES listed in Use Cases 1.1 and 3.1

TABLE 6

Input Subsystem Command
Use Case ID 1.5 Use Case Title: Input Subsystem Command

The Vehicle Software sends a Command to the chosen Vehicle Component.
The Command is parsed into a signal name.
The Response from the signal name is determined.
The Response is sent to the Component Panel for display.
ALTERNATIVES listed in sub use cases listed below

TABLE 7

Determine Respone
Use Case ID #1.6 Use Case Title: Determine Response

The Vehicle Software sends a Command.
The Response is determined for the Command.
ALTERNATIVES listed in Use Case 2.1

TABLE 8

Record Test Case
Use Case ID #2 Use Case Title: Record Test Case

The Recorder runs the Software Test Environment (STE) executable.
The Recorder logs into the STE.
The Recorder selects the RECORD test mode from the Test Panel.
The Recorder selects the component name from the Test Panel.
The selected Component Panel appears on the computer display.
The Recorder chooses commands on the Component Panel.
The Test Vector records the commands in a file.
The commands from the Component Panel are parsed and sent to the Vehicle Software.
The Parser parses a Command message from the Vehicle Software.
The Parser uses the Interface Control Document (ICD) to decode the message.
The Parser parses a Response message to the Vehicle Software.
The Parser uses the component ICD to encode the message.
The Vehicle Software sends a Command to the chosen Vehicle Component.
The Command is parsed into a signal name.
The Response from the signal name is determined.
The Response is sent to the Component Panel for display.
The Recorder identifies the expected delay on the Component Panel.
The Test Vector records the delay in a file.
The Recorder identifies the expected responses on the Component Panel.
The Test Vector records the expected responses in a file.
ALTERNATIVES listed in sub-use cases below

TABLE 9

Select Test Mode
Use Case ID #2.1 Use Case Title: Select Test Mode

The Recorder runs the Software Test Environment (STE) executable.
The Recorder logs into the STE.
The Recorder selects the RECORD test mode from the Test Panel.
ALTERNATIVES listed in Use cases 1.1 and 2.1

TABLE 10

Select Subsystem Panel
Use Case ID #2.2 Use Case Title: Select Subsystem Panel The Recorder selects the component name from the Test Panel.
The selected Component Panel appears on the computer display.
ALTERNATIVES listed in Use cases 1.1 and 2.1

TABLE 11

Use Case ID #2.3

The Recorder chooses commands on the Component Panel.
The Test Vector records the commands in a file.
The commands from the Component Panel are parsed and sent to the Vehicle Software.
ALTERNATIVES listed in Use case 3.1

TABLE 12

Translate Message
Use Case ID #2.4 Use Case Title: Translate Message

The Parser parses a Command message from the Vehicle Software.
The Parser uses the Interface Control Document (ICD) to decode the message.
The Parser parses a Response message to the Vehicle Software.
The Parser uses the component ICD to encode the message.
ALTERNATIVES listed in Use cases 1.1 and 3.1

TABLE 13

Input Subsystem Command
Use Case ID #2.5 Use Case Title: Input Subsystem Command The Vehicle Software sends a Command to the chosen Vehicle Component.
The Command is parsed into a signal name.
The Response from the signal name is determined.
The Response is sent to the Component Panel for display.
ALTERNATIVES listed in Use case 4.1

TABLE 14

Determine Response
Use Case ID #2.6 Use Case Title: Determine Response

The Vehicle Software sends a Command.
The Response is determined for the Command.
ALTERNATIVES listed in Use case 2.1

TABLE 15

Identify Delay
Use Case ID #.7 Use Case Title: Identify Delay

The Recorder identifies the expected delay on the Component Panel.
The Test Vector records the delay in a file.
ALTERNATIVES None

TABLE 16

Identify Expected Response
Use Case ID #2.8 Use Case Title: Identify Expected Response The Recorder identifies the expected responses on the Component Panel.
The Test Vector records the expected responses in a file.
ALTERNATIVES None

TABLE 17

Auto Test Case
Use Case for Auto Test
Use Case ID #3 Use Case Title: Auto Test Case The Auto Tester runs the Software Test Environment (STE) executable.
The Auto Tester logs into the STE.
The Auto Tester selects the AUTO test mode from the Test Panel.
The Replayer retrieves the batchName from the Test Panel.
The Replayer reads the testName from batchName
The Test Vector selects the component name from the Test Panel.
The selected Component Panel appears on the computer display.
The Test Vector processes commands from testName.
The Test Vector stimulates the commands.
The commands are parsed and sent to the Vehicle Software.
The Parser parses a Command message from the Vehicle Software.
The Parser uses the Interface Control Document (ICD) to decode the message.
The Parser parses a Response message to the Vehicle Software.
The Parser uses the component ICD to encode the message.
The Vehicle Software sends a Command to the chosen Vehicle Component.
The Command is parsed into a signal name.
The Response from the signal name is determined.
The Response is sent to the Component Panel for display.
The Test Vector inserts the Test Delay.
The Test Vector receives the test results.
The Test Vector compares the test results with the expect results.
The Test Vector reports test results.
The Replayer creates the test output report.
ALTERNATIVES listed in sub-use cases below.

TABLE 18

Select Test Mode
Use Case ID #3.1 Use Case Title: Select Test Mode

The Auto Tester runs the Software Test Environment (STE) executable.
The Auto Tester logs into the STE.
The Auto Tester selects the AUTO test mode from the Test Panel.
ALTERNATIVES see Use cases 1.1 and 2.1

TABLE 19

Read Test Name
Use Case ID #3.2 Use Case Title: Read Test Name

The Replayer retrieves the batchName from the Test Panel.
The Replayer reads the testName from batchName
ALTERNATIVES listed in Use case 2.1

TABLE 20

Select Subsystem Panel
Use Case ID #3.3 Use Case Title: Select Subsystem Panel

The Test Vector selects the component name from the Test Panel.
The selected Component Panel appears on the computer display.
ALTERNATIVES listed in Use cases 1.1 and 2.1

TABLE 21

Stimulate Subsystem Status
Use Case ID #3.4 Use Case Title: Stimulate Subsystem Status The Test Vector processes commands from testName.
The Test Vector stimulates the commands.
The commands are parsed and sent to the Vehicle Software.
ALTERNATIVES listed in Use case 2.1

TABLE 22

Translate Message
Use Case ID #3.5 Use Case Title: Translate Message

The Parser parses a Command message from the Vehicle Software.
The Parser uses the Interface Control Document (ICD) to decode the message.
The Parser parses a Response message to the Vehicle Software.
The Parser uses the component ICD to encode the message.
ALTERNATIVES listed in Use cases 1.1 and 3.1

TABLE 23

Input Subsystem Command
Use Case ID #3.6 Use Case Title: Input Subsystem Command The Vehicle Software sends a Command to the chosen Vehicle Component.
The Command is parsed into a signal name.
The Response from the signal name is determined.
The Response is sent to the Component Panel for display.
ALTERNATIVES listed in Use case 4.1

TABLE 24

Determine Response
Use Case ID #3.7 Use Case Title: Determine Response

The Vehicle Software sends a Command.
The Response is determined for the Command.
ALTERNATIVES listed in Use case 2.1

TABLE 25

Insert Test Delay
Use Case ID #3.8 Use Case Title: Insert Test Delay

The Test Vector inserts the Test Delay.
ALTERNATIVES listed in Use case 1.1

TABLE 26

Check Output
Use Case ID #3.9 Use Case Title: Check Output

The Test Vector receives the test results.
The Test Vector compares the test results with the expect results.
The Test Vector reports test results.
ALTERNATIVES listed in Use case 3.1

TABLE 27

Create Report
Use Case ID #3.10 Use Case Title: Create Report

The Replayer creates the test output report.
ALTERNATIVES None

Figure 15:
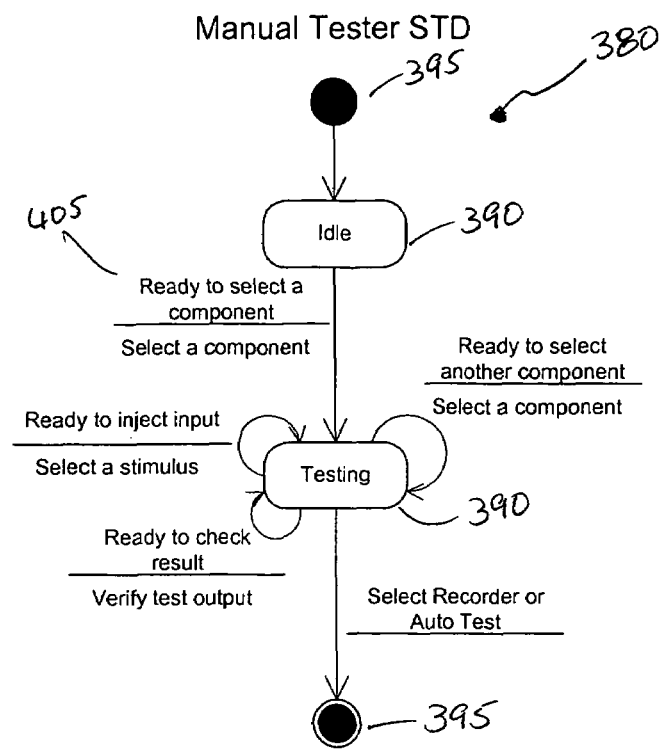
FIG. 15 is Manual Test State Transition Diagram.
Figure 16:
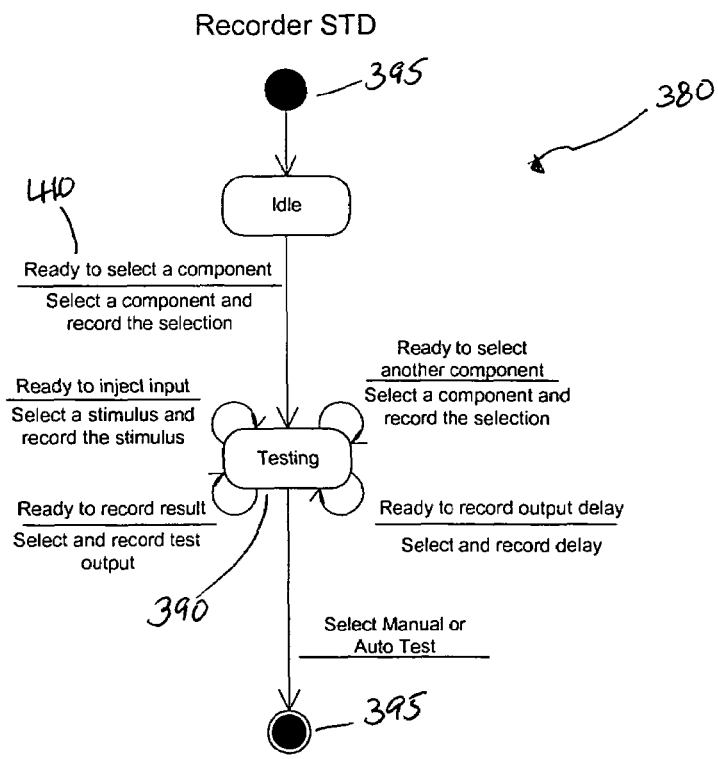
FIG. 16 illustrates a Record Test State Transition Diagram.
Figure 17:
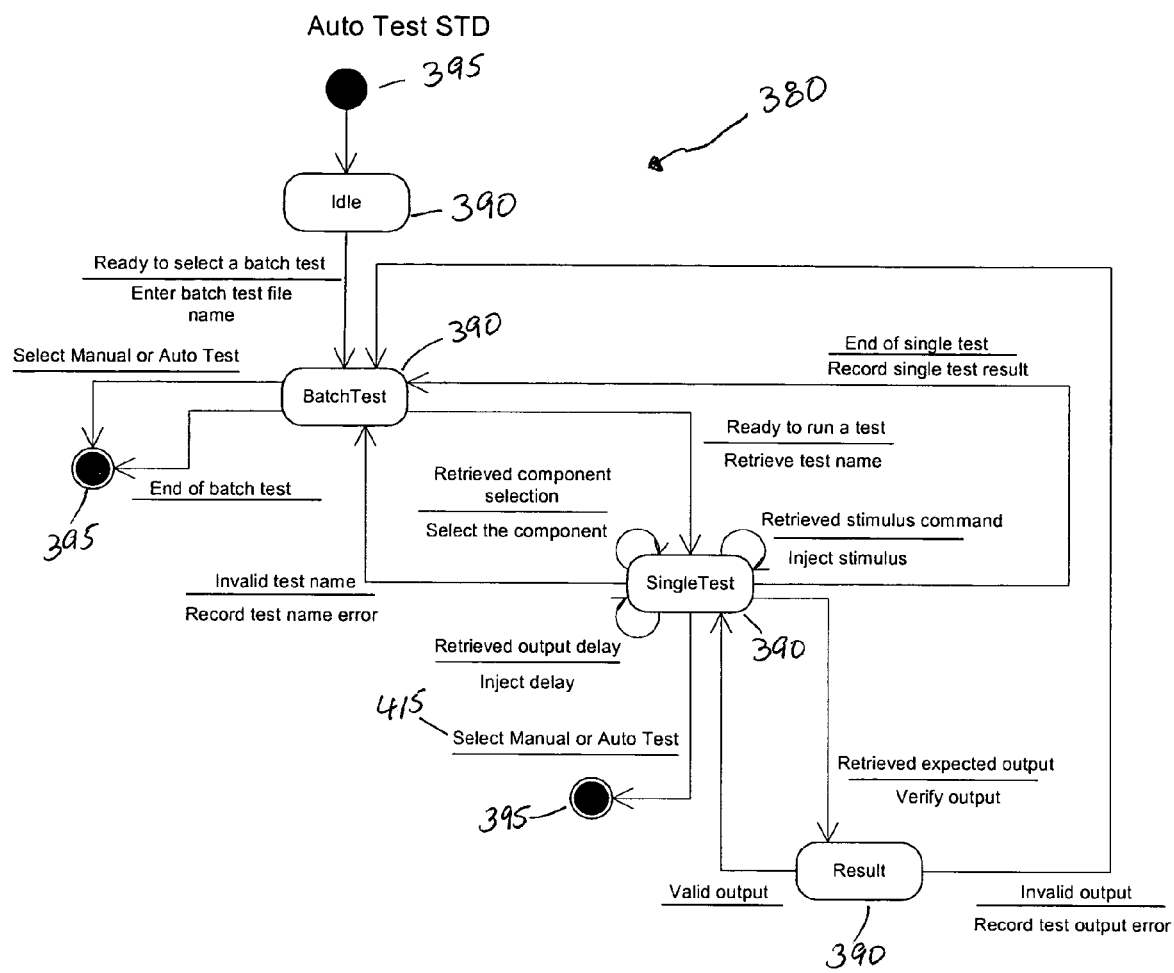
FIG. 17 is an illustration of an Auto Test State Transition Diagram.

The use cases are supplemented by the state transition diagrams 380 illustrated in FIGS. 15-17. Each state diagram is a graphical representation of the behavior of the STE 120 in terms of the sequences of states 390 that software object 395 transitions through during its life in response to events that cause the state transition and the software object's responses and actions in response to the event. The state transition diagram traces the behavior of the software object 395 over the entire set of use cases the object may be a part of. There are three state transition diagram representations for the present invention corresponding to one of the Manual Tester state 405, Recorder state 410 and Auto Test state 415 respectively. The major events initiated by a test operator and the change in the STE's 120 behavior due to the initiation of the events are listed in Table 28 below.

TABLE 28

STE Major Event Listing

| Major Event | Behavior Change |
|---|---|
| Start STE | Start the STE |
| Select Manual Test | STE transitions to manual testing state |
| Select Record Test | STE transitions to test recording state |
| Select Auto Test | STE transitions to auto testing state |
| Select a component | STE displays the selected component GUI panel, which displays the component status and allows the tester to inject test stimulus |

TABLE 28-continued

STE Major Event Listing

| Major Event | Behavior Change |
| --- | --- |
| Inject component stimulus | STE sends the component stimulus to the Vehicle Software. The Vehicle Software may react to the stimulus and send command(s)/status to one or more components in the STE. While in test recording state, the stimulus is also recorded in a test vector file. |
| Record expected test output | While in test recording state, component status displayed on GUI panel is selected for recording in a test vector file |
| Record expected test output delay | While in test recording state, expected response delay (before the component status is displayed on GUI panel) is selected for recording in a test vector file |
| Select Batch Test | In automated testing, selecting batch test initiates auto testing of one or more recorded test vector file(s). The number of test vector files to be processed is specified in the batch file. |

After initial start-up, the STE 120 will default to the Manual Tester state 405. While performing manual testing, the tester may select to transition to the Recorder state 410 or the Auto Test state 415. While performing test recording, the tester may select to transition to the Manual Tester state 405 or the Auto Test state 415. If the Auto Test state 415 is selected, the STE 120 will transition to auto testing. A 30 Hz timer is used to initiate periodic subsystem heartbeat response. It will be understood by one of skill in the art that the use cases capture the functional requirements of the STE 120 as a whole while the state transition diagrams capture the behavior of software objects that comprise the STE 120.

Associated with the software architecture of the STE 120 discussed above, there is a data structure best described with reference to FIG. 18. As illustrated in FIG. 18, STE 120 contains three primary data structures that can be categorized as External Text File 430, Internal Table 435 and Ethernet Message 440 configured in a directory hierarchy 450. These primary data structures are relevant in all the Simulated Subsystems and STE operating modes (MANUAL, RECORD and REPLAY). The data structure category comprising External Text File includes a Main Subsystem File 460. The Main Subsystem File 460 references at least one Subsystem file 465 and, responsive to tester input, a Batch File 470. Each Subsystem file 465 includes a reference to a Subsystem Command File 473, Subsystem Socket File 475 and an Interface Control Document file 480. In the exemplary embodiment illustrated in FIG. 18, the Main Subsystem file 460 is called out as "STE.main" and contains a list of subsystem acronyms each of which references a subsystem 145 that will be simulated by the STE 120. A short description of each acronym and the functionality simulated by the STE 120 is also included in this file. An example of this file is shown in Table 29.

TABLE 29

Contents of the Main Subsystem File (STE.main)

//Simulated Subsystems
IBAS_MCS
GSCP
GHS
//IBAS = The Improved Bradley Acquisition Subsystem (IBAS) consists of the Target Acquisition Subsystem (TAS), the Missile Control Subsystem (MCS) and the Second Generation Common Electronics Unit (SGCEU). The purpose of the IBAS is to provide greatly increased target acquisition capability over the existing Integrated Sight. The improvements include a second generation Forward Looking Infrared TABLE 29-continued Contents of the Main Subsystem File (STE.main)

(FLIR), an automatic target tracker, an eyesafe laser range finder (LRF) and a dual axis stabilized mirror. The MCS consists of a computer to provide dual target tracking, TOW missile tracking and guidance, IBAS control and an interface with the A3 core electronics. It contains the control and processing electronics for the FLIR. Full functionality of the MCS is simulated.
//GSCP = Gunner's Sight Control Panel (GSCP): The GSCP provides the selections for adjusting the IBAS binocular and the video image for the gunner's sight. The sight adjustment switches on the GSCP will only adjust the sight being displayed when the gunner has control of the sight. Full functionality of the GSCP is simulated.
//GHS = Gunner's Handstation (GHS The Gunner's Handstation (GHS) is a multi-function yoke assembly. The GHS is used to provide Line of Sight (LOS)/Line of Fire (LOF) movement commands. The GHS is also used to fire the weapons and the Laser Rangefinder, adjust the sights and provide IBAS autotracker commands.

Figure 29:
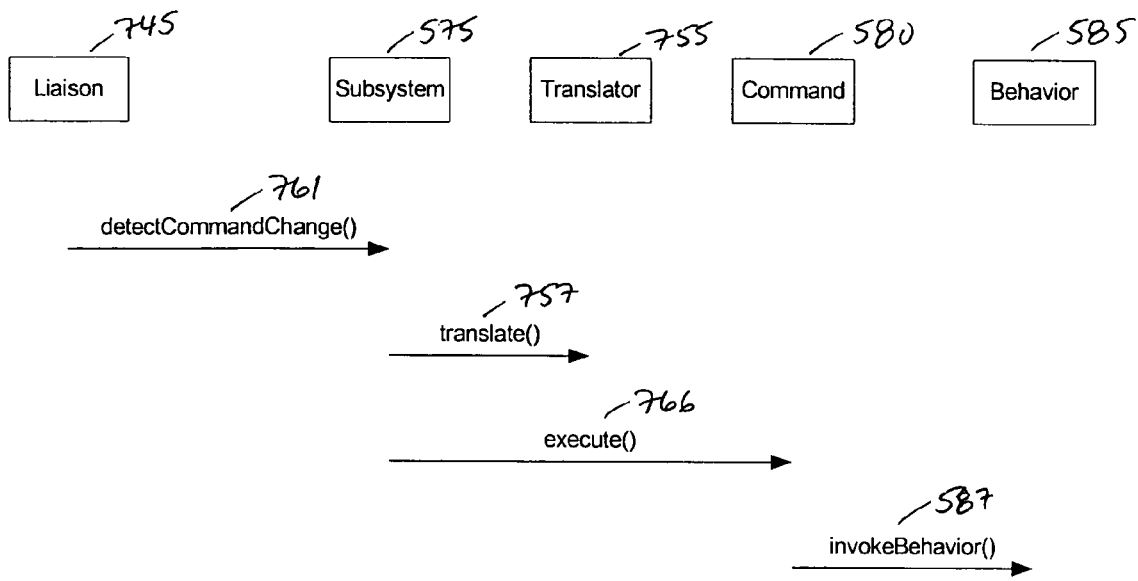
FIG. 29 is an activity diagram of the STE showing the sequence of steps involved in Vehicle Software Sending Command to Subsystem.

The STE 120 uses the text file STE.main, illustrated in FIG. 29, to find and load the corresponding subsystem files at initialization. The entries prefixed by a "//" serve as comments to a user and are ignored by the STE 120. As illustrated in Table 29, the two subsystem acronyms—IBAS_MCS and GSCP reference the Simulated Subsystem 145 that will be simulated by the STE 120. Each Simulated Subsystem 145 listed in STE.main has a corresponding Subsystem Command File 473. This file defines the structure of the Simulated Subsystem 145 and the data flow for each command. At initialization, this file is processed to create instances for each subsystem command, behavior type and response as will be described in detail below. It must be appreciated that the acronyms are part of a naming convention used for convenience of representation and retrieval of files in the directory hierarchy 450. As such, the present invention is not limited by the acronyms, the specific contents of the files referenced by the acronyms or the particular format exemplified in the contents of the files referenced by the tables.

Currently, the STE 120 supports four types of subsystem behavior: PASS-THROUGH, INCREMENT, TOGGLE and GUI-INPUT. Other behavior types can be added by using object oriented programming (OOP) principles as will be described in the following paragraphs. In the PASS-THROUGH behavior type, the Simulated Subsystem 145 receives a command from the vehicle software and passes the status of the command back to the vehicle software. In the INCREMENT behavior type, the Simulated Subsystem receives a command from the vehicle software and transfers a response incremented by one back to the vehicle software. The TOGGLE behavior type requires that the Simulated Subsystem receive either a one or zero from the vehicle software and respond with the opposite bit. For example, if the command=0, the response=1 or if the command=1, the response=0. In the GUI-INPUT behavior type, the Simulated Subsystem receives a command from the vehicle software and transfers a response based on the GUI input that corresponds to the command back to the vehicle software. The commands or statuses of the Simulated Subsystems 145 can be displayed on the GUI panels 215:

For example, based on the above behavior types and the example of Table 28, exemplary Subsystem Command Files 473 will be IBAS_MCS.command and GSCP.command. The structure of each exemplary Subsystem Command File is shown in Table 30. In the exemplary embodiment, all data fields are separated by horizontal bars "|".

TABLE 30

Example Contents of the Subsystem Command File (IBAS_MCS.command)

| //Command Name | //Behavior Type | //Response Name | //ResponseSA |
|---|---|---|---|
| IBAS_LRF_FST_CMD | PASS-THROUGH | IBAS_LRF_FL_STAT | 1 |
| IBAS_LRF_LST_CMD | PASS-THROUGH | IBAS_LRF_FL_STAT | 1 |
| IBAS_PROCESS_CNT | INCREMENT | IBAS_PROCESS_CNT_STAT | 1 |
| IBAS_LRF_RNG_TOG | TOGGLE | IBAS_LRF_RNG_TOG_STAT | 2 |
| IBAS_LRF_FIRE_CMD | GUI-INPUT | IBAS_LASER_RANGE | 2 |
| IBAS_LRF_FIRE_CMD | GUI-INPUT | IBAS_VALID_RANGE | 2 |

Each subsystem listed in STE.main also has a corresponding Subsystem Socket File 475 as illustrated in FIG. 18. This file defines the Ethernet port for each subsystem. In the exemplary embodiment, the Subsystem Socket file 475 comprises two Subsystem Socket files: IBAS_MCS.socket and GSCP.socket illustrated in Tables 31 and 32 below.

TABLE 31

Example Contents of the Subsystem Socket File (IBAS_MCS.socket)

| //RT Number | //Transmit or Receive | //Subaddress | //Ethernet Port Number |
|---|---|---|---|
| 14 | Transmit | 1, 2, 3, 5, 7 | 6000 |
| 14 | Receive | 1, 2, 8, 9 | 7000 |

TABLE 32

Example Contents of the Subsystem Socket File (GSCP.socket)

| //RT Number | //Transmit or Receive | //Subaddress | //Ethernet Port Number |
|---|---|---|---|
| 21 | Transmit | 1, 2 | 6100 |
| 21 | Receive | 1 | 7100 |

Each subsystem listed in STE.main is provided with a corresponding Interface Control File 480 depicted in FIG. 18. This file contains the MIL-STD-1553B data bus messages as identified in the Interface Control Document (ICD) 482 for a specific subsystem 145. This file is used to translate discrete signal names to the correct MIL-STD-1553B remote terminal, subaddress, word number, start bit, and bit length. It is also used to translate the Ethernet messages to discrete signal names for processing by the STE 120. An example Interface Control Document File 480 is shown in Table 33.

TABLE 33

Example Contents of the Interface Control Document File (IBAS_MCS.var)

| //Signal Name | //Comment | //Units | //Coded | //1553ID | //Word | //Start Bit | //Bit Length | //DataType | //Scale | | |
|---|---|---|---|---|---|---|---|---|---|---|---|
| IBAS_DVO_SYM_CMD | TPU_MCS-01-2 | None | Y | 7028 | 2 | 6 | 1 | U | 0.000000 | Off | On |
| IBAS_DVO_SYM_STA | MCS_TPU-1-3 | None | Y | 7427 | 3 | 6 | 1 | U | 0.000000 | Off | On |
| IBAS_LASER_RANGE | MCS_TPU-01-4 | meters | N | 7427 | 4 | 0 | 11 | U | 5.000000 | | |
| IBAS_LRF_FST_CMD | TPU_MCS-01-8 | None | Y | 7028 | 8 | 13 | 1 | U | 0.000000 | Last | First |
| IBAS_LRF_FST_LST | MCS_TPU-01-4 | None | Y | 7427 | 4 | 12 | 1 | U | 0.000000 | Last | First |
| IBAS_LRF_RNG_TOG | MCS_TPU-01-4 | None | Y | 7427 | 4 | 15 | 1 | U | 0.000000 | 0 | 1 |
| IBAS_NEW_RNG_CMD | TPU_MCS-01-8 | None | Y | 7028 | 8 | 12 | 1 | U | 0.000000 | No New Range | New Range |
| IBAS_OUT_RANGE | TPU_MCS-02-1 | None | Y | 7044 | 1 | 4 | 1 | U | 0.000000 | Within | Too Far |

When the STE 120 is in RECORD mode, the STE 120 creates a Test Vector File 485 that captures each test step conducted by the user and the corresponding responses from the CVS 125. The structure of each Test Vector File 485 is shown in Table 34. The STE 120 supports five test commands including SET, which sets the state or value of the signal name on the control panel, GET, which retrieves state or value from the GUI panel to be transferred to the vehicle software, ACTIVATE, which momentary activation of a GUI control that is transferred to the vehicle software, CHECK, which compares the signal name to the expected state or value and WAIT x:, which introduces a delay of x seconds.

TABLE 34

Example Contents of a Test Vector File (TT1.vector)

| //Step Number | //Test Command | //Signal Name | //Signal State or Value |
| --- | --- | --- | --- |
| 0001 | SET | IBAS_LASER_RANGE | 2000 meters |
| 0002 | SET | IBAS_RANGE_RTN_STAT | VALID |
| 0003 | ACTIVATE | GHS_FIRE_LASER | FIRE |
| 0004 | CHECK | IBAS_LASER_FIRE_CMD | LASER_FIRE |
| 0005 | GET | IBAS_LASER_RANGE | 2000 meters |
| 0006 | ACTIVATE | GSCP_FIRST_RETURN | FIRST |
| 0007 | CHECK | IBAS_LRF_FRT_LST_CMD | FIRST |
| 0008 | SET | IBAS_RANGE_RTN_STAT | INVALID |
| 0009 | ACTIVATE | GHS_FIRE_LASER | FIRE |
| 0010 | CHECK | IBAS_LASER_FIRE_CMD | LASER_FIRE |
| 0011 | GET | IBAS_RANGE_RTN_STAT | INVALID |

As illustrated in FIG. 18, The Main Subsystem File 460 optionally references a Batch File 470 that in turn may reference a Test Vector File 490 and a Test Report File 505. The Test vector File 490 contains a list of test vectors 485 that have been previously recorded for the REPLAY mechanism to execute in the STE 120. The STE 120 reads each step sequentially from each test vector 495 until the list has been completely replayed. The Test Report File 505 contains a Test Report 510 generated after a Batch test is replayed. The Test Report 505 contains a listing of the pass/fail results for the replayed test vectors 485. For each failed test vector 485, the failed step number is specified. An example Test Report is shown in Table 35.

TABLE 35

Example Contents of the Test Report File

| //Test Vector | //Replay Result | //Failed Test Steps |
| --- | --- | --- |
| TT1 | passed | |
| TT2 | failed | 0003, 0007 |
| TT3 | passed | |
| TT4 | failed | 0006, 0008, 0010 |

In general, the Command Files are needed to execute the STE 120, and the Test Files are created and used by the STE 120 during RECORD or REPLAY mode. The STE.main file 460 and corresponding *.command, *.socket files and *.var files illustrated in FIG. 18 are read into internal tables 435 during the initialization of the STE executable, STE.exe shown in FIG. 18. The internal tables 435 are used to build the classes 530 and dependencies 535 before the STE executes. Classes 530 and dependencies 535 will be described in the succeeding sections. No dynamic instantiations of any classes 530 occur at run-time. The Test Vectors 485 and Test Batch files 470 are read into internal tables 435 as they are called by the STE 120 in RECORD or REPLAY mode. Every Ethernet message 440 that passes between the STE 120 and the CVS 125 over the Ethernet connection 135 contains forty words representing a header of four words, a remote terminal address of one word, a sub-address of one word, data words of between one thru thirty two words, and a checksum of two words. The STE 120 populates this data structure for Ethernet outputs and parses the data structure for Ethernet inputs.

A primary embodiment of the present invention is developed using an object oriented programming (OOP) methodology. OOP is facilitated by using object oriented programming languages such as JAVA and C++. An exemplary embodiment of the invention discussed next, is programmed using SUN® Microsystems' JAVA™ programming language. The OOP methodology utilizes objects as building blocks of the program. Each object is a software construct that encapsulates data, procedure and structure sufficient for implementing a particular piece of logic or other functionality required to execute at least a portion of a process of the program of which the object is a part. Generally, the OOP methodology provides for a reuse of software objects in other processes within the same program or other programs that together form a software package that achieves a specific programming goal. The reuse is made possible by enforcing certain industry wide standards in the conception, development and deployment of the program and the OOP components that comprise the program. For example, the STE 120 of the present invention is derived using the Rational Software Development Process and the "4+1" View Software Architectural Model. As set forth above, the logical view of the "4+1" Software Architectural Model decomposes the functional requirements of the STE 120 into a set of key abstractions in the form of reusable objects or object classes. The reuse is promoted by using common software architecture for the OOP components fostered for example, by the use of design patterns as an overarching framework within which to develop the program or application. The Model-View-Controller (MVC) Pattern and Command Pattern are two primary design patterns used for the STE 120 software architecture. A class 530, for example, forms one of the fundamental units of the STE 120 and an object 532 is a particular instance of the class.

Figure 21:
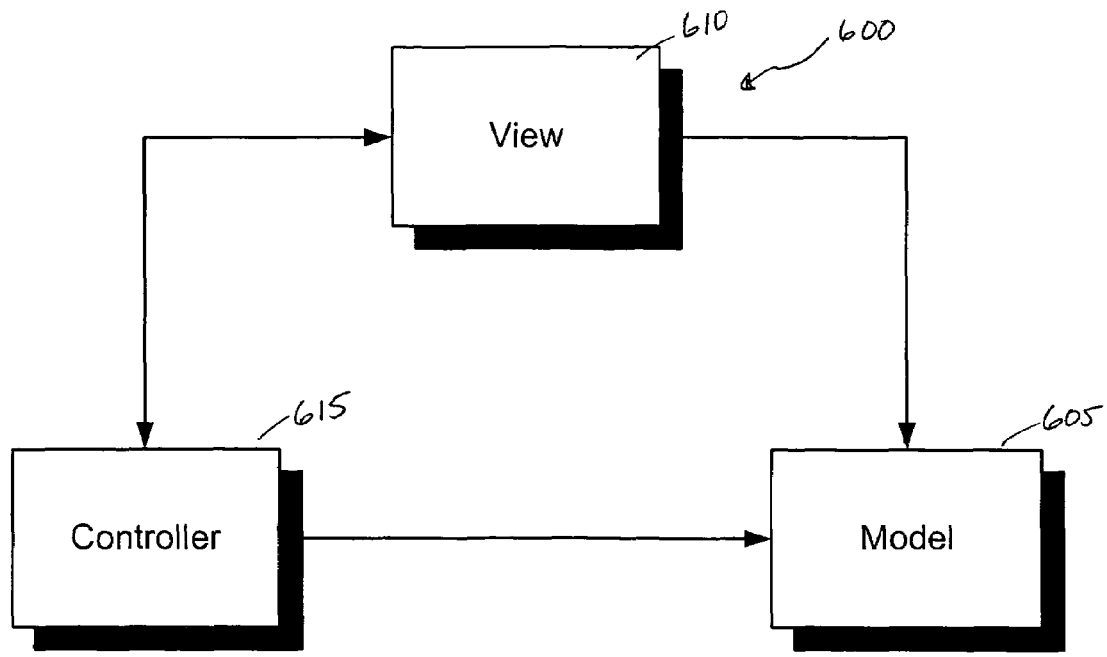
FIG. 21 is a block diagram illustrating the Model-View-Controller (MVC) design pattern.

Referring now to FIGS. 19 thru 21, FIG. 19 illustrates an exemplary Command Pattern 550 that one of skill in the art will recognize to be the object-oriented version of a callback. The purpose of the Command Pattern is to decouple the sender from the receiver. In this example, the IBAS_PROCESS_CNT object 555 tells its command object INCREMENT 560 to execute ( ). The command object 560 tells the IBAS_PROCESS_CNT_STAT 565 to execute the add_one ( ) method when execute ( ) is called. In the context of the STE 120, this Command pattern 550 is used for each subsystem class 575 structure that relates the subsystem commands class 580, behavior class 585 and response class 590 as shown in the class diagram structure 570 of a subsystem 145 illustrated in FIG. 20.

Figure 22:
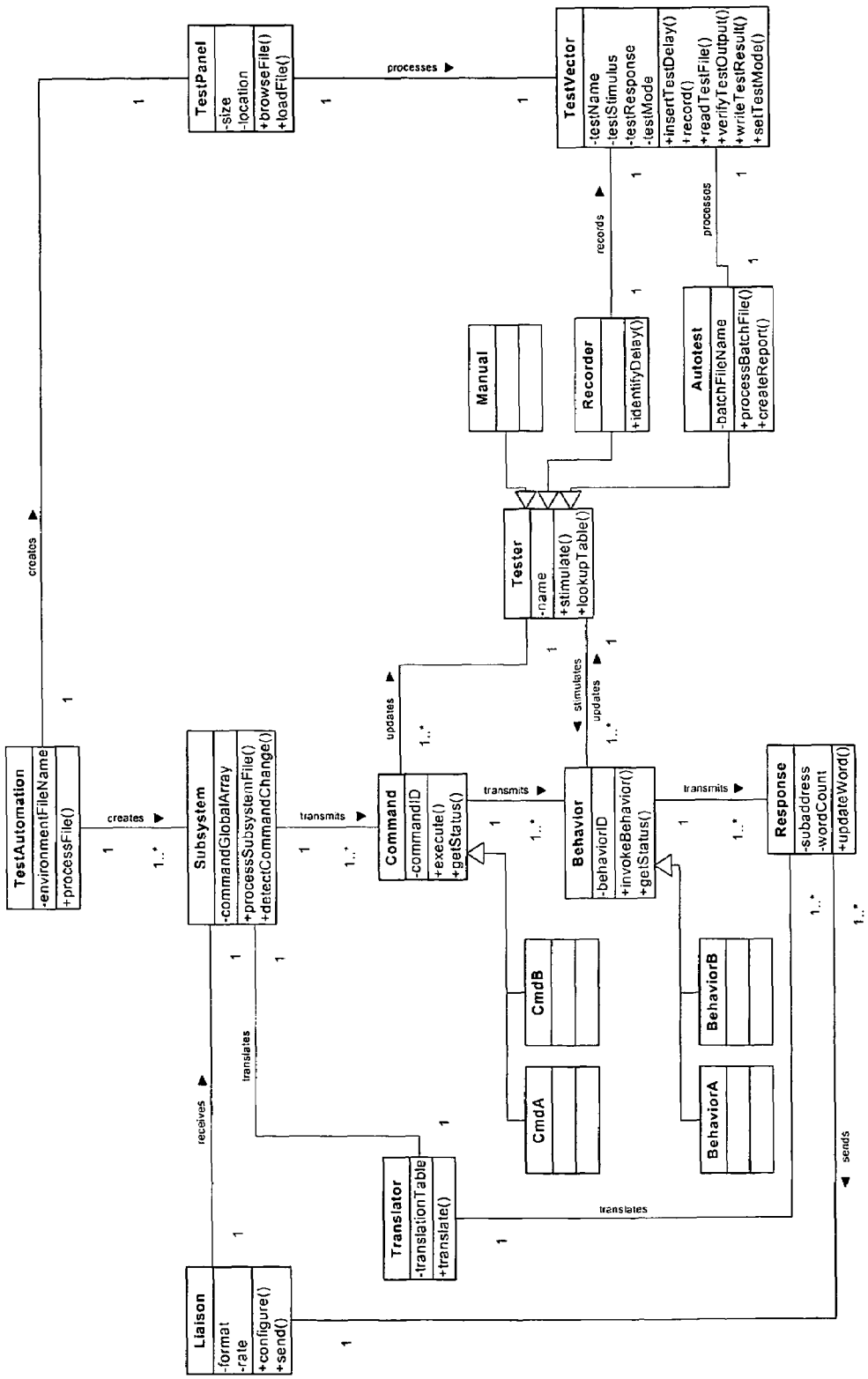
FIG. 22 is a Software Test Environment unified modeling language (UML) Class Diagram.

FIG. 22 depicts the Model-View-Controller (MVC) 600 design pattern that is used for the GUI panel 215. With the MVC pattern 600, a program or application is subdivided into three parts. The first part is the Model 605 which is the set of classes 530 that hold the technical information. For example, in the STE 120, the models are the objects 532 defined from the *.command files discussed above. The second part is the View 610 which includes the components used to define the representation of information on a screen. For example, in the STE 120, these components are the GUI elements such as toggle switches, radio buttons, user text fields checkboxes, LEDs and labels on the subsystem control panels. The third part is the Controller 615, which is the component that controls the interaction with the user. In the STE 120, the controller classes are the callback routines that are executed when the user selects a toggle switch or a check box on the control panel. It will be apparent to one of skill in the art that when an Integrated Development Environment (IDE) such as for example, Borland JBuilder® is employed during development, these classes are automatically generated after a GUI panel is constructed and compiled.

Figure 23:
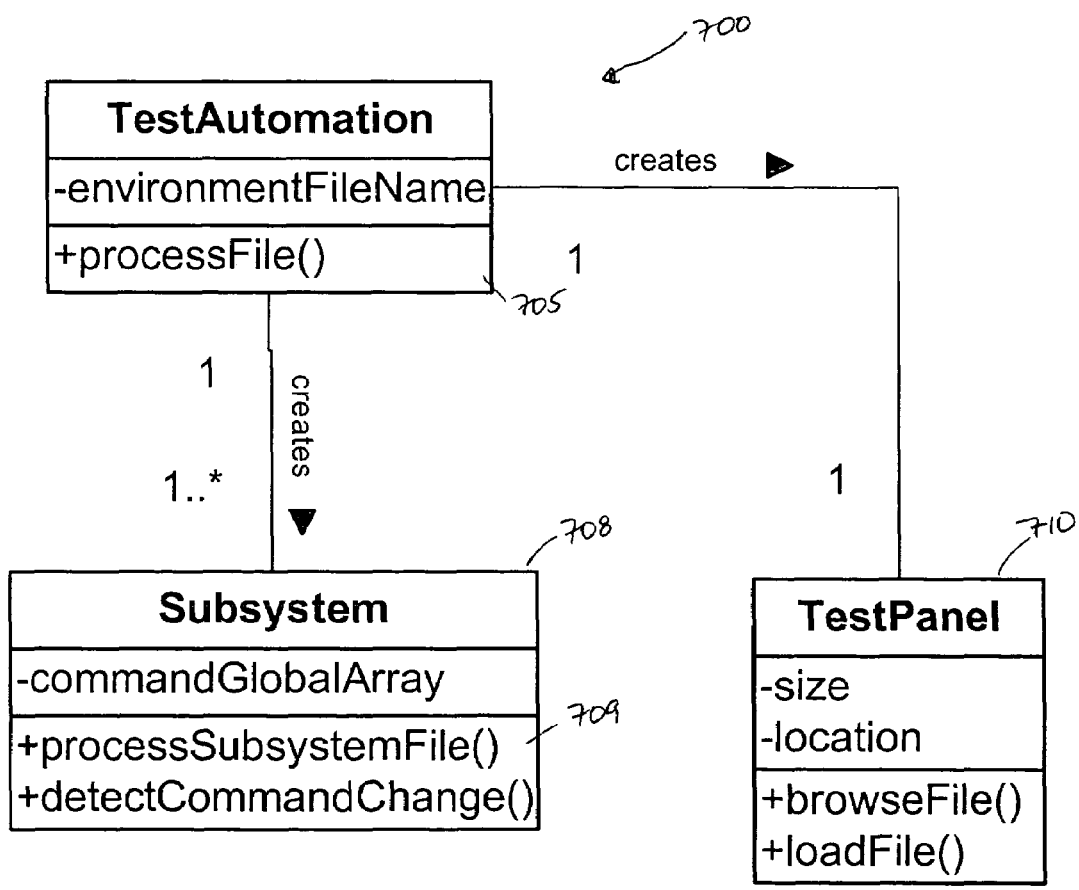
FIG. 23 is a diagrammatic representation of the TestAutomation class.

FIG. 22 illustrates the program structure of the STE 120 with a UML class diagram 650. The relationship between the Module flow diagram in FIG. 5 and the class diagram in FIG. 23 is shown in Table 36. Each class is described in detail in the following sections.

TABLE 36

Relationship between the System Module Flow Diagram and the UML Class Diagram

| Module | Associated Classes |
| --- | --- |
| Translator | Liaison, Translator |
| Simulated Subsystem | Subsystem, Command, Behavior, Response |
| Record/Replay | TestVector, Recorder, Autotest |
| GUI | TestPanel, Manual |
| Tester | Tester |

FIG. 23 illustrates a diagram of the class relationship of the STE 120 framework that runs on the STE Computer 120 in accordance with the present invention. As illustrated in the UML class diagram 650 of FIG. 22, the TestAutomation class 700 is the principal class that initiates the STE 120 with the main method which in turn instantiates the classes that provide the objects that carry on tasks required to implement the logic of the STE 120. As can be seen from FIG. 23, at the STE.exe initialization, the TestAutomation class 700 executes processFile( ) method 705 to read the STE.main file. After reading the subsystems 145 listed in STE.main, the processFile( ) method 705 creates one instance of the TestPanel class 710 and the appropriate number of instances of the Subsystem class 708 as listed in STE.main. Although the TestAutomation class 700 is utilized only once during the execution of the STE.exe, it provides the entire structure for the Simulated Subsystems so that manual and automated testing can be performed.

Figure 24:
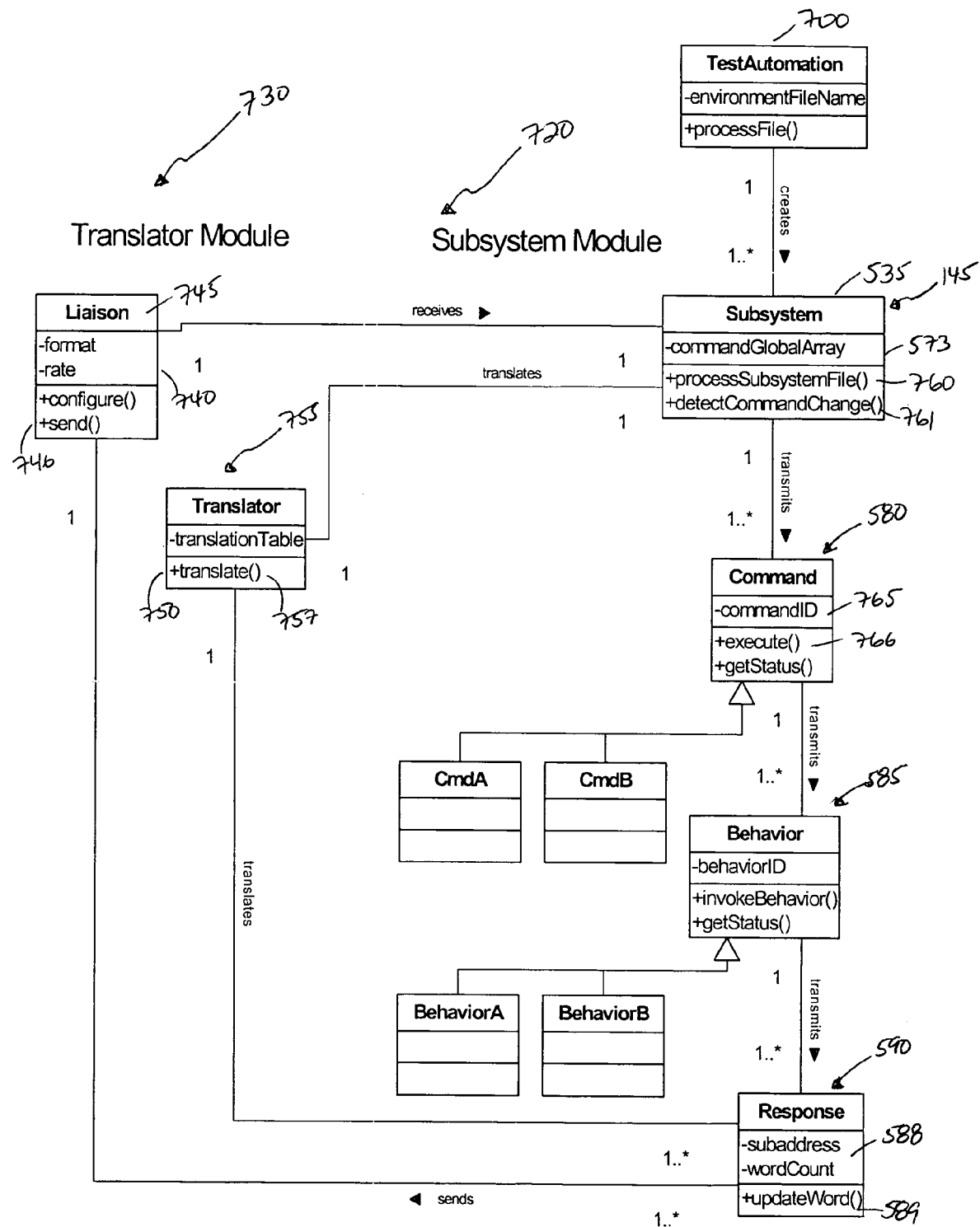
FIG. 24 is a flowchart illustrating the hierarchy of classes in the Subsystem Module.

Referring now to FIG. 24, there is illustrated a Simulated Subsystem Module 720 and a Translator Module 730. The Simulated Subsystem Module 720 includes a Subsystem class 575, which as noted in connection with the illustration of FIG. 19, relates the Subsystem commands class 580, behavior class 585 and response class 590 as shown in the class diagram structure illustrated in FIG. 24.

In particular, the Simulated Subsystem Module 720 includes the Command class 580 and its child classes (CmdA, CmdB . . . CndX), the Behavior class and its child classes (BehaviorA, BehaviorB . . . BehaviorX), and the Response class. When triggered by the TestAutomation class 705 at initialization, the Subsystem class 575 is instantiated for each Simulated Subsystem 145 listed in STE.main 450. After the Subsystem class 575 is created along with its command GlobalArray that stores the command states in MIL-STD-1553 format, the Subsystem class 575 creates a first object 740 of the Liaison class 745 and a second object 750 of the Translator class 755. It then uses the processSubsystemFile ( ) method 760 to read the associated *.command file 473. An object is created with a unique commandID 765 for each command listed in the *.command file 473. Also, objects are created for each unique behavior and response. The associations between the Command class 580, Behavior class 585, and Response class 590 are formed for each subsystem 145 as specified in the *.command file 473.

Figure 25:
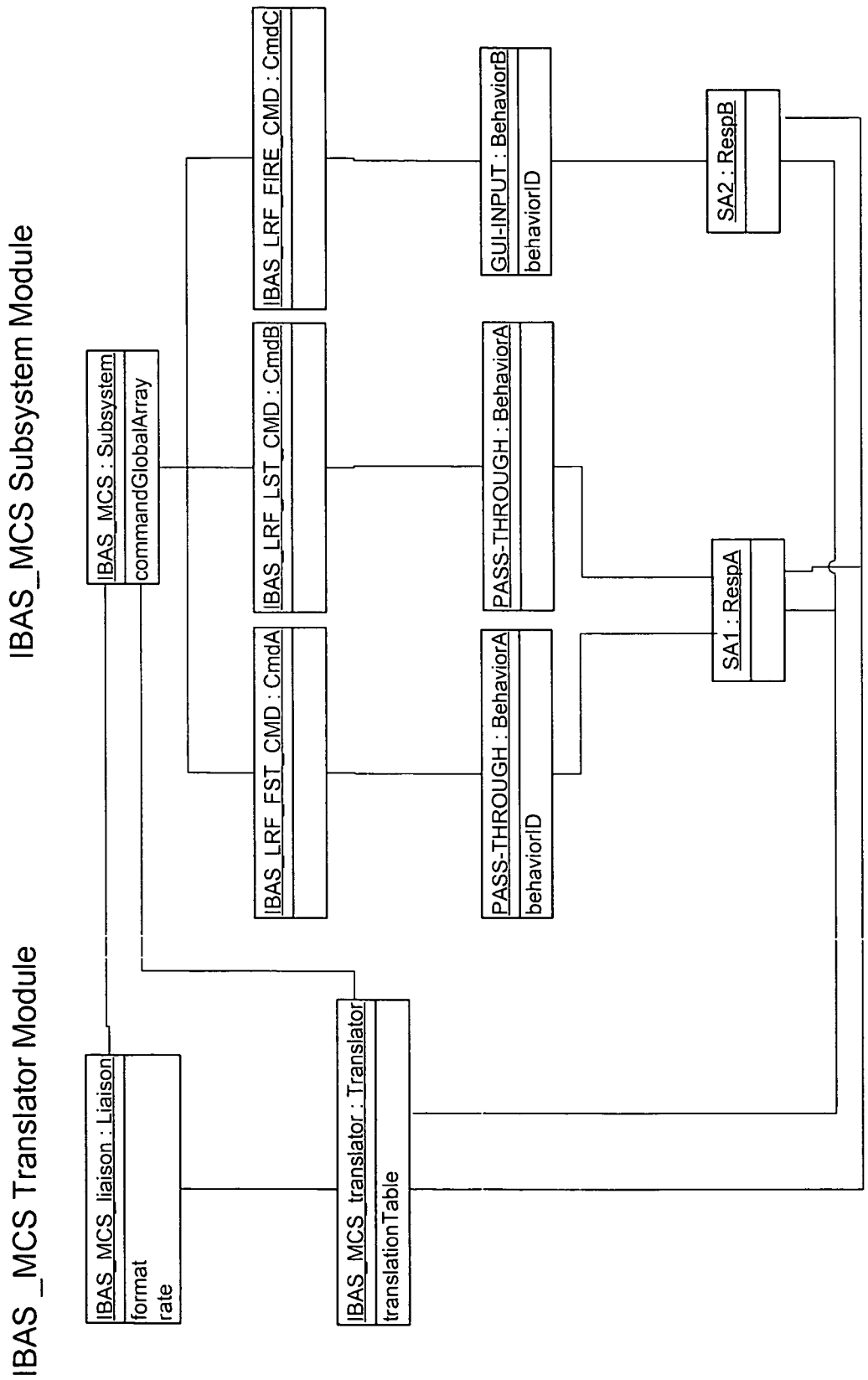
FIG. 25 is a Subsystem object structure based on Table 29: IBAS_MCS.command.

Referring again to FIG. 24, it is seen that upon initialization by the TestAutomation Class 700, the Subsystem class 575 triggers the instantiation of the Liaison class 745 and Translator class 755 for each Simulated Subsystem 145. Each object 740 of the Liaison class is assigned a local Ethernet port number identified in the *.socket file 475. After establishing TCP/IP communication between the STE 120 and external computer 110 that hosts the CVS 125, the object 740 of the Liaison 745 receives or sends TCP/IP data packets from the external interface through the local port on the STE computer 120. When the object 740 of the Liaison 745 receives data from the external computer 110, it configures and sends the data to an object 573 of Subsystem class 575. When the object 740 of the Liaison class 745 receives data from the object 588 of the Response class 590, it configures and sends the data to the external computer 130 via Ethernet transmission. After the object 750 of the Translator class 755 is instantiated by the Translator class 755, the object 750 of the Translator class 755 reads the associated *.var file 480 and creates a translation table in memory. The Translator object 750 uses the translate (method 757 and its translation table to convert discrete signal names from the Response object 588 to the correct MLT-STD-1553 subaddress, word number, start bit, and bit length. The Translator object 750 is also used to translate the MLT-STD-1553 formatted data from the Subsystem object 573 to discrete signal names. An example Subsystem object structure is shown in FIG. 25 based on the command file 473 in Table 30.

Figure 26:
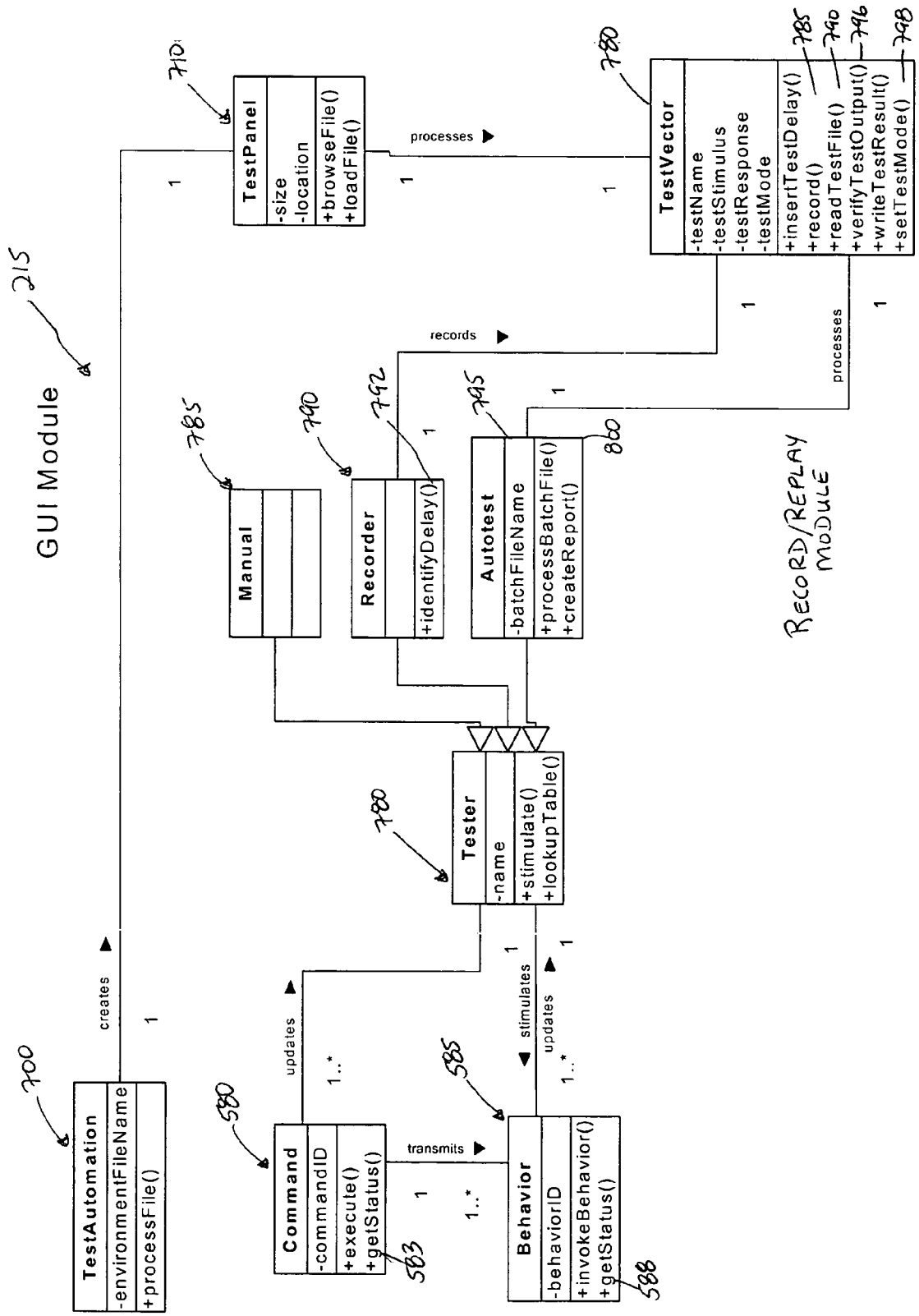
FIG. 26 depicts a functional block representation of the GUI Module & Record Replay Module.

FIG. 26 depicts the class structure of the GUI Module 215 and the Record/Replay Module 225. As disclosed in FIG. 26, the GUI Module 215 consists of the Tester class 780 and its child classes the Manual class 785, the Recorder class 790 and the Autotest class 795 as well as the TestPanel class 710. All of the classes in the GUI Module 215 are instantiated at the initialization of the STE.exe 460. The Tester class 780 and TestPanel class 710 are operative to instantiate objects suited to display toggle switches, radio buttons, user text fields checkboxes, LEDs and labels on the STE screen display 122. Each GUI element is associated with a commandID 765 or a behaviorID 767 and is updated by the Command class 580 and the Behavior class 585 when a state change occurs. The STE 120 can be executed in three modes: MANUAL, RECORD, or REPLAY as shown by the Manual class 785, the Recorder class 790 and the Autotest class 795. TestPanel class 710 displays this mode selection. The Record/Replay Module 225 consists of one class, the TestVector class 780, but it is closely coupled to the classes of the GUI Module 215. The Record/Replay Module 225 provides record and replay capabilities for test cases. In RECORD mode, the TestVector class 780 stores the Simulated Subsystem commands and responses in a test file using the record( ) method 785. In REPLAY mode, the TestVector class 780 class replays a recorded test case using the readTestFile( ) method 790. The recorded commands are sent to the GUI Module 215 for replay stimulation of the CVS 125. The GUI Module 215 sends the TestVector class 780 the associated responses to the commands and dynamically compares the recorded responses to the replayed responses using the verifyTestOutput( ) method 795. The TestVector 780 creates a test report based on the compared results.

The STE's program event sequence is illustrated with UML sequence diagrams of FIGS. 27-32. FIGS. 27-32 show the event sequence for each STE operating mode: MANUAL, RECORD and REPLAY. A sequence diagram describes how groups of objects collaborate in accomplishing some system behavior during the life of the objects in the group. The life of the object is depicted on the horizontal axis while the vertical axis depicts the sequence by which the object is instantiated.

Figure 27:
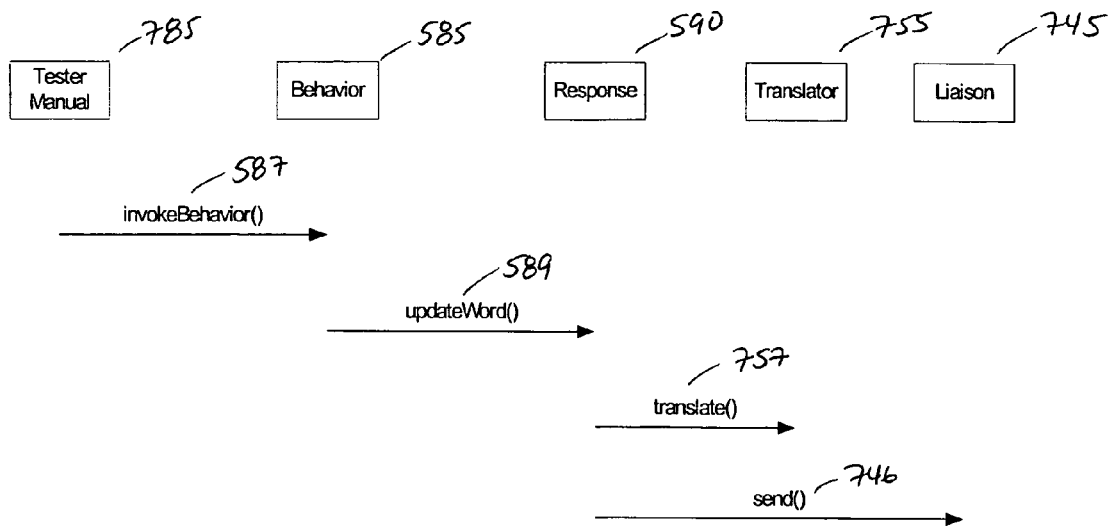
FIG. 27 is an activity diagram of the STE showing the sequence of steps involved in sending response status to the Vehicle Software.

Referring now to FIG. 27, a first test sequence is shown to demonstrate the flow for conducting a manual test for sending the response status to the CVS 125. The manual tester through the Tester class 780 and Manual class 785 stimulates the response status by calling invokeBehavior( ) method 587 from Behavior class 585. The Behavior class 585 calls the updateword( ) method 589 from Response class 590 to update the response status. The Response class 590 calls translate( ) method 757 from Translator class 755 to translate the data into MLT-STD-1553 format. Next, the Response class 590 calls send( ) method 746 from Liaison class 745 to pack the data into Ethernet format to send to the Vehicle Software 125.

Figure 28:
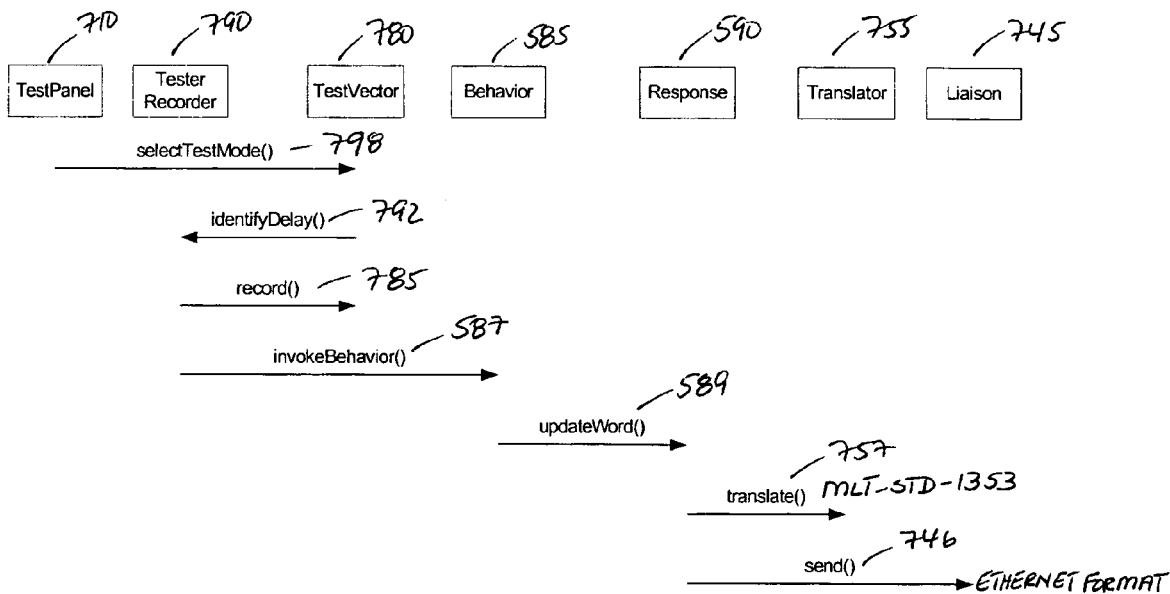
FIG. 28 is an activity diagram of the STE showing the sequence of steps involved in Sending Response Status to the Vehicle Software.

FIG. 28 illustrates a second test sequence that demonstrates the flow of a record test for sending the response status to the CVS 125. The tester through the Tester class 780 and Manual class 785 selects the RECORD test mode from TestPanel class 710 and sets the test mode by calling selectTestMode( ) 798 from TestVector class 780. The TestVector class 780 calls identifyDelay( ) method 792 from Recorder class 790 to set the delay. The Recorder class 790 calls records method 785 from TestVector class 780 to record the response. The Recorder class 790 stimulates the response status by calling invokeBehavior( ) method 587 from Behavior class 585. The Behavior class 585 calls updateword( ) method 589 from Response class 590 to update the response status. The Response class 590 calls translates method 757 from Translator class 755 to translate the data into MLT-STD-1553 format. Next, the Response class 590 calls send( ) method 746 from the Liaison class 745 to pack the data into Ethernet format to send to the Vehicle Software 125.

Figure 30:
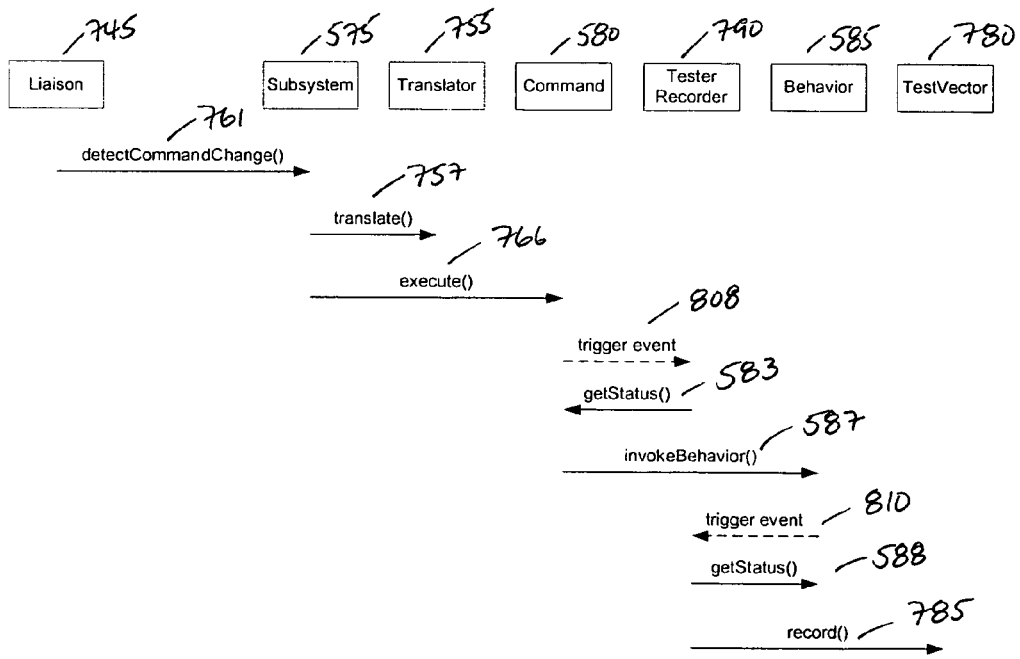
FIG. 30 is an activity diagram of the STE showing the sequence of steps involved in Vehicle Software Sending Command to Subsystem.

FIGS. 29-30 illustrate a third test sequence that demonstrates the flow of a record test for the Vehicle Software 125 sending a command to Subsystem class 575. The Vehicle Software 125 sends an Ethernet message to Liaison class 745. The Liaison class 745 strips the Ethernet header and calls detectCommandChange( ) 761 from Subsystem class 575 to detect any command change. The Subsystem class 575 calls translate( ) 757 from Translator class 755 to translate the MLT-STD-1553 data into a discrete signal. The Subsystem class 575 calls execute( ) 766 from Command to execute the discrete signal command. The Command 580 triggers an event 808 to Recorder 790 if the command state has changed, and the Recorder 790 calls getStatus( ) 583 from Command 580 to get the current state. Next, the Command 580 calls invokeBehavior( ) 587 from Behavior 585. Behavior 585 triggers an event 810 to Recorder 790 to update the status by calling getStatus( ) 588. The Recorder 790 calls records 785 from TestVector 780 to record the command state and response status.

Figure 31:
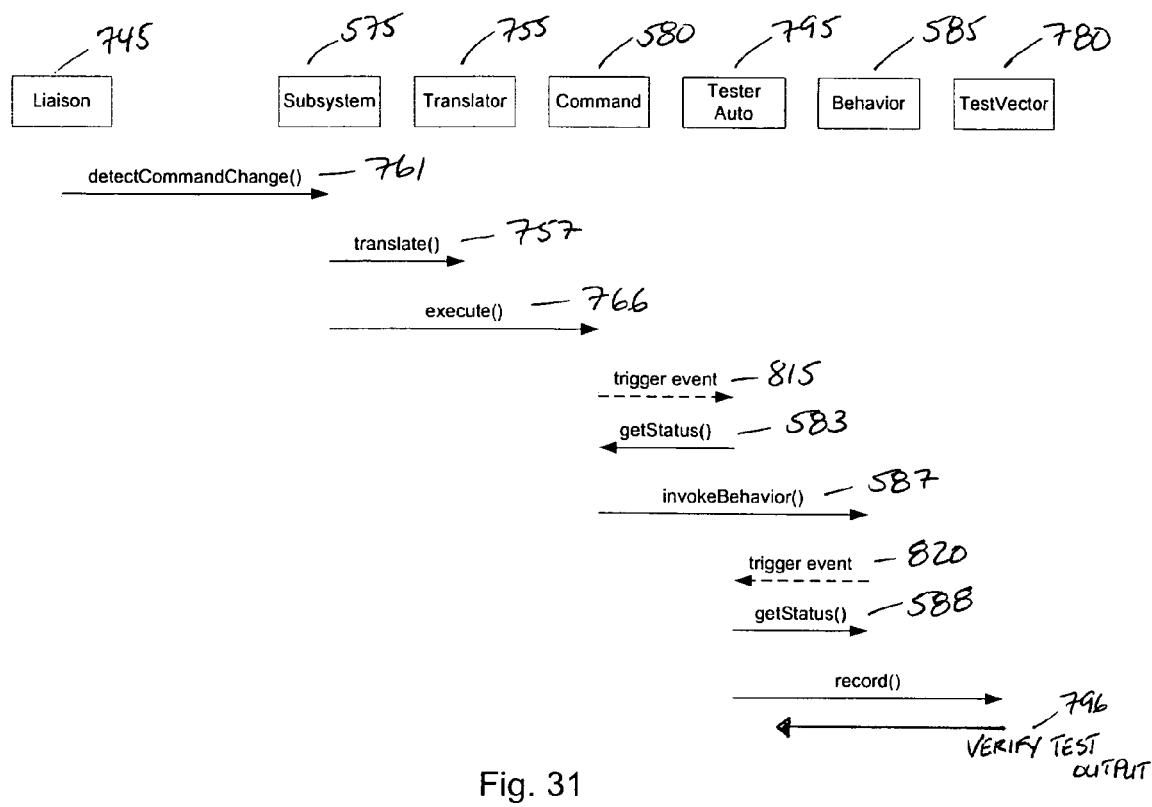
FIG. 31 is an activity diagram of the STE showing the sequence of steps involved in Vehicle Software Sending Command to Subsystem.

FIG. 31 discloses a fourth test sequence to demonstrate the flow of an auto test for the Vehicle Software 125 sending a command to Subsystem 575. The Vehicle Software 125 sends an Ethernet message to Liaison 745. The Liaison 745 strips the Ethernet header and calls detectCommandChange( ) 761 from Subsystem 575 to detect any command change. The Subsystem 575 calls translate( ) 757 from Translator 755 to translate the MLT-STD-1553 data into a discrete signal. The Subsystem 575 calls execute( ) 766 from Command 580 to execute the discrete signal command. The Command 580 triggers an event 815 to Auto Tester 795 if the command state has changed, and the Auto Tester 795 calls getStatus( ) 583 from Command 580 to get the current state. Next, the Command 580 calls invokeBehavior( ) 587 from Behavior 585. Behavior 585 triggers an event 820 to Auto Tester 795 to update the status by calling getStatus( ) 588. The Auto Tester 795 calls verifyTestOutput( ) 796 from TestVector 780 to verify the discrete signal with their expected state.

Figure 32:
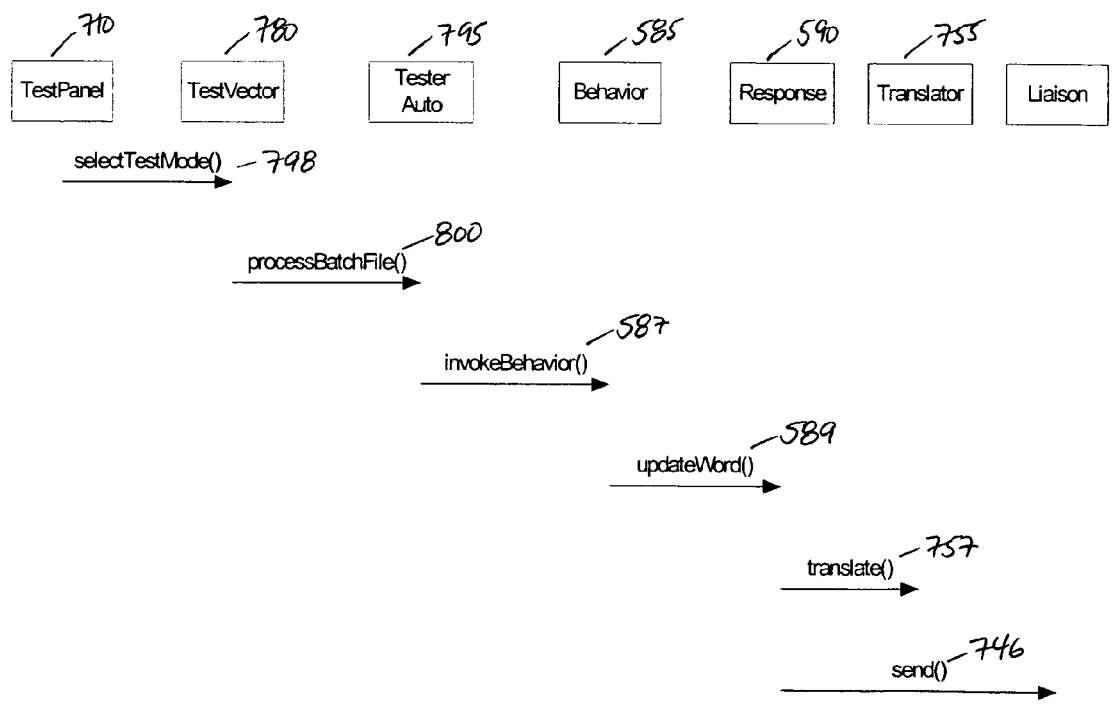
FIG. 32 is an activity diagram of the STE showing the sequence of steps involved in Sending Response Status to the Vehicle Software.

FIG. 32 illustrates a fifth test sequence to demonstrate the flow of an auto test for sending the response status to the Vehicle Software 125. The tester (i.e. user) through the Tester class 780 and Manual class 785 selects the REPLAY mode and the test filename from the TestPanel 710. The tester sets the test mode by calling selectTectMode( ) 798 from TestVector 780. The TestVector 780 calls processBatchFile( ) 800 from Auto Tester 795 to process the test commands and responses to stimulate the response status by calling invokeBehavior( ) 587 from Behavior 585. The Behavior 585 calls updateWord( ) 589 from Response 590 to update the response status. The Response 590 calls translates 757 from Translator 755 to translate the data into the MLT-STD-1553 format. Next, the Response 590 calls send( ) 746 from Liaison 745 to pack the data into Ethernet format to send to the Vehicle Software 125.

Figure 33:
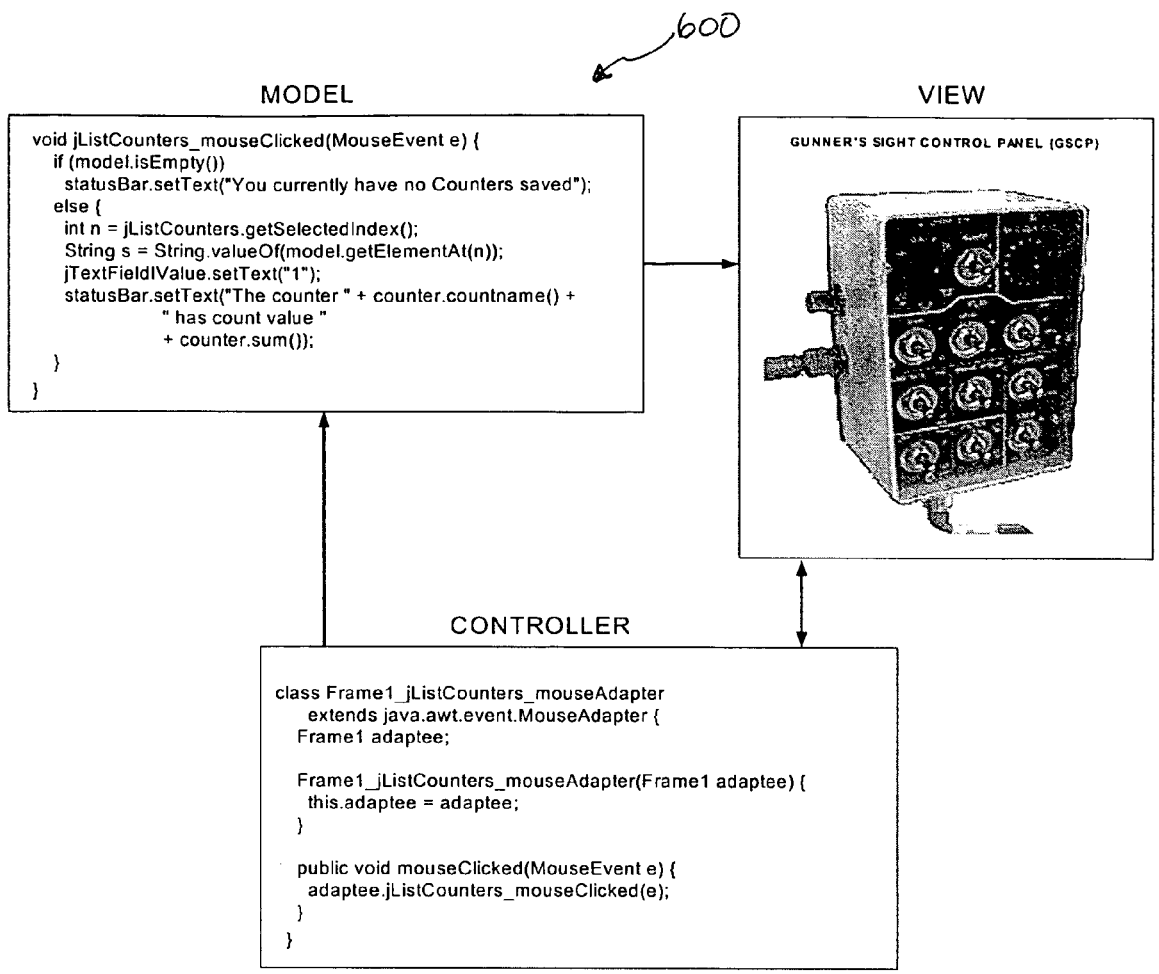
FIG. 33 is a flow diagram of an exemplary MVC Pattern using JAVA2 Swing.

The STE 120 provides a GUI panel 215 for testers to conduct manual testing. The GUI panel 215 may include, for example, a display, a keyboard and a mouse or other well-known hardware devices for testers to enter inputs and to observe results. As noted in a preceding section, the STE 120 provides the tester with the capability to record test sequences of the manual testing steps including input and/or outputs via the GUI panel 215. The STE 120 also allows the tester to replay the recorded steps automatically by specifying a batch test file. During the replay, the STE 120 generates a test report file containing pass/fail test results. The Model-View-Controller (MVC) Pattern 600 illustrated in FIG. 21 is the primary design pattern used for the GUI panel 215 of STE 120. Since JAVA2 has been chosen as the software language for the STE 120, all GUI panels 215 are built with JAVA2 Swing component classes. Borland's JBuilder is employed as the Integrated Development Environment (IDE). The JBuilder automatically generates the required GUI classes 710 after the GUI panel 215 is constructed and compiled. FIG. 33 provides an example of a GUI MVC pattern 600 of the present invention.

Figure 34:
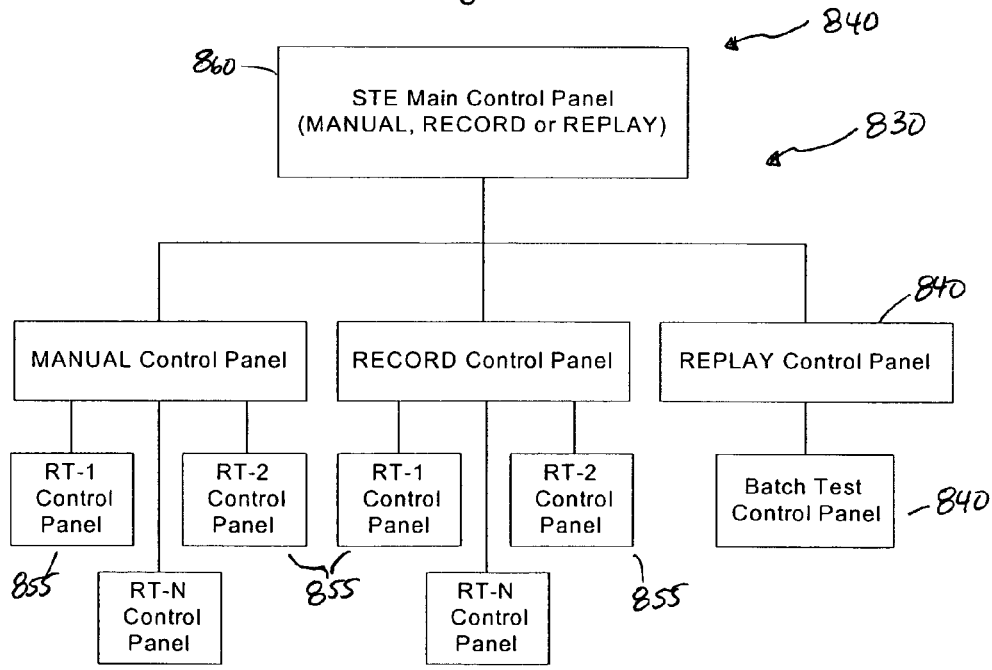
FIG. 34 is a flow diagram of a STE GUI Panel Hierarchy.
Figure 35:
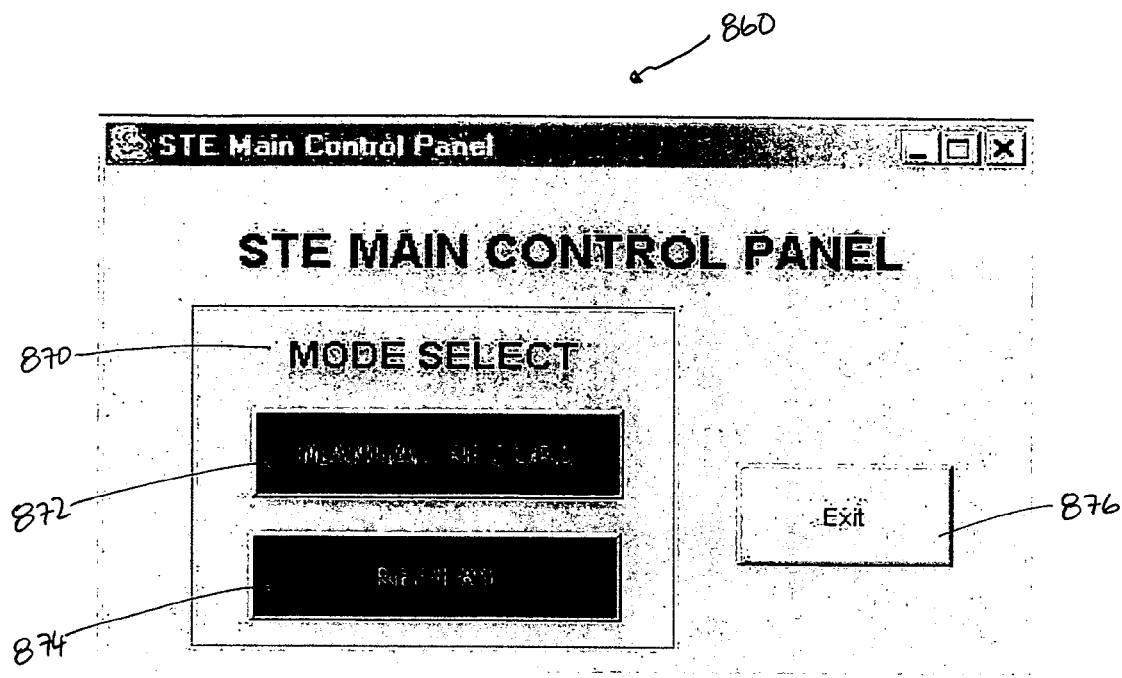
FIG. 35 is an illustration of a STE Main Control Panel.

The exemplary embodiment of FIG. 34 depicts a STE GUI panel 215 hierarchy 830 based on layers of different panels 840, each controlling various functions of the STE 120. RT-1, RT-2 . . . RT-N Control Panels 855 correspond to each individual Simulated Subsystem 145. The STE Main Control Panel 860 allows the user to select the operating mode of the STE. After running STE 120, the MAIN Control Panel 860 will display. FIG. 35 shows a screen display of a exemplary Main Control Panel 865. The exemplary Main Control Panel 865 includes a menu field 870 in the form of a MODE SELECT icon with two buttons labeled MANUAL/RECORD 872 and REPLAY 874 respectively. The human user can specify the appropriate mode of operation for the STE 120 by selecting one of the buttons and/or exit the STE operation by selecting the EXIT 876 button. In an alternate embodiment, the user may be presented with three buttons corresponding to each of the MANUAL, RECORD and REPLAY mode of operation of the STE 120.

Figure 36:
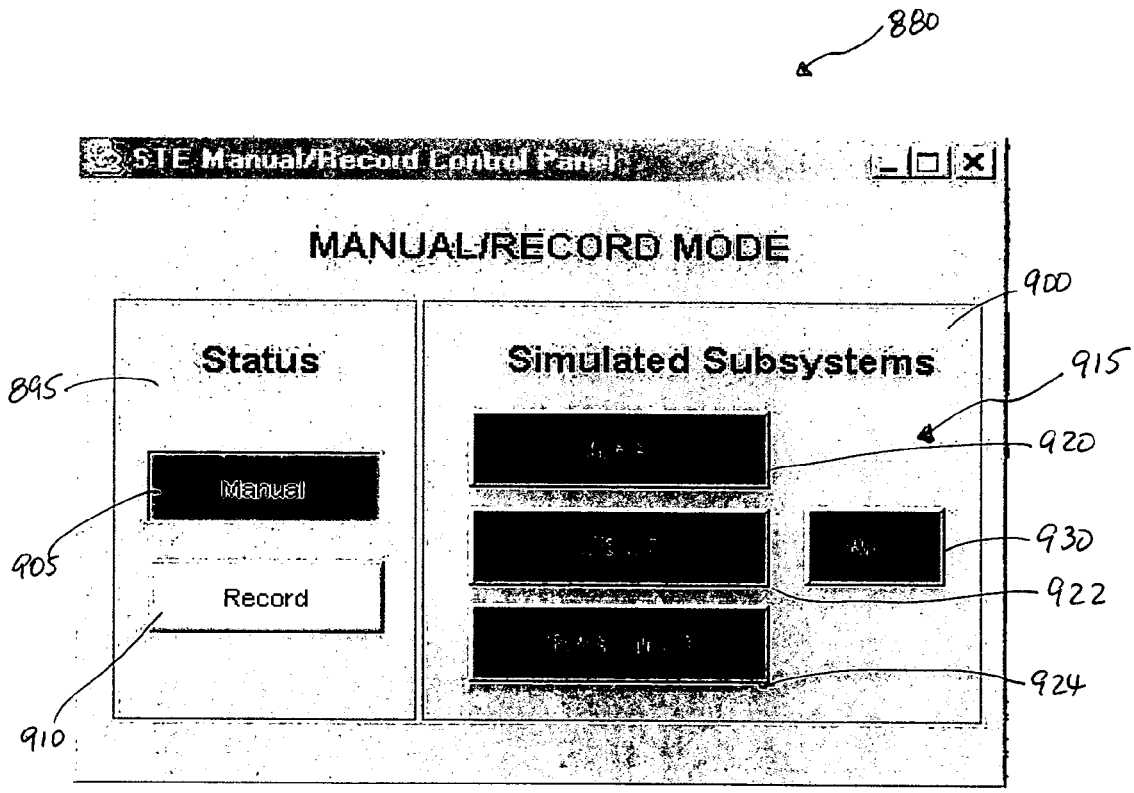
FIG. 36 is an illustration of a Manual/Record Mode Control Panel.
Figure 38:
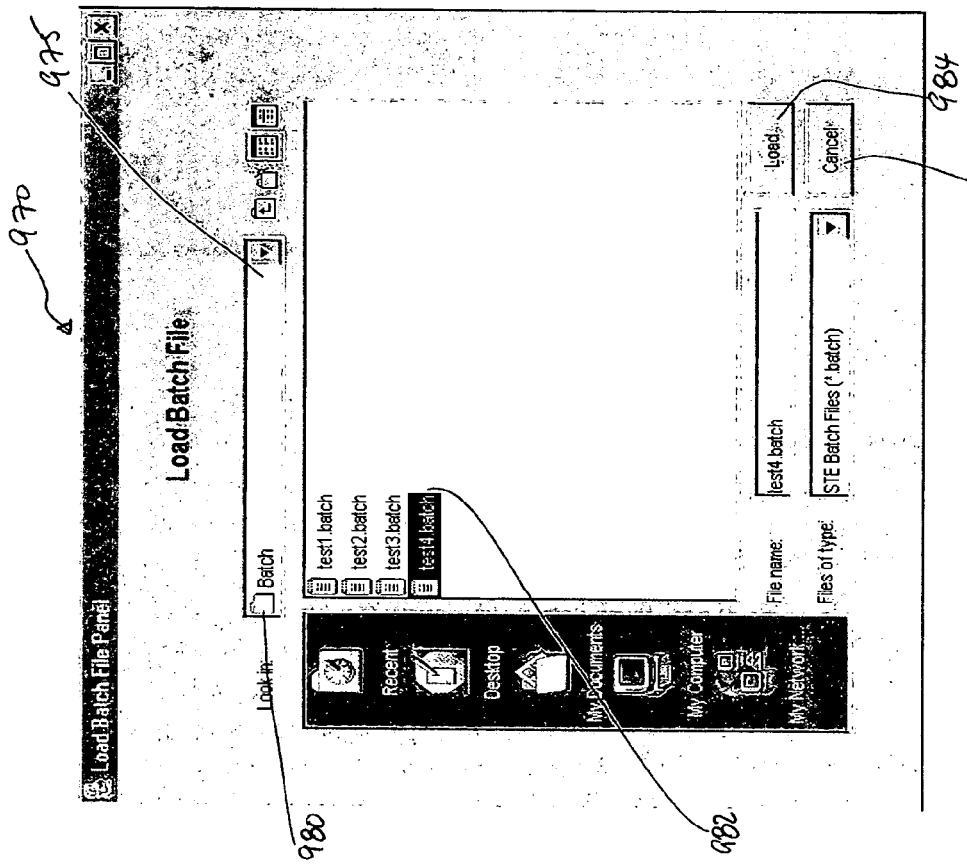
FIG. 38 is an illustration of a Load Batch File.
Figure 37:
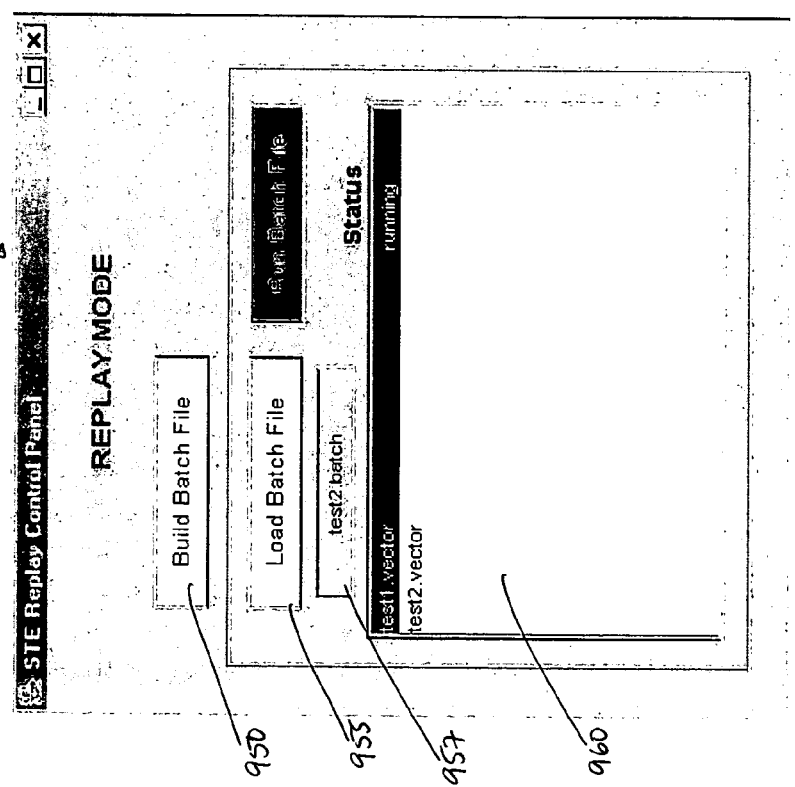
FIG. 37 illustrates a Replay Mode Control Panel.

In the exemplary embodiment illustrated in FIG. 34, selecting the MANUAL/RECORD 872 button will display the M/R Control Panel 880 illustrated in FIG. 36. The M/R Control Panel 880 of FIG. 36 includes a status menu field 895 and a Simulated Subsystems menu field 900. Menu field 895 presents the human tester the option of selecting a MANUAL 905 button or a RECORD 910 button. The Simulated Subsystems menu field 900 includes buttons 915 for each of the Simulated Subsystems 145 of the STE 120 specified in the Main Subsystem File 460 illustrated in Table 29. The exemplary embodiment of FIG. 36 depicts three subsystems selections: GHS 920, GSCP 922 and IBAS_MCS 924. The user can select the standalone button 930 labeled ALL to select all of the available Simulated Subsystems in menu field 900.

Selecting REPLAY 874 in the exemplary embodiment illustrated in FIG. 34 will display the Replay Control Panel 940. The Replay Control Panel 940 allows manual entry of a batch file name that is to be created using the BUILD BATCH FILE 950 button and selection of a batch file name that is to be loaded using LOAD BATCH FILE 955 button. The Replay Control Panel 940 includes a text input box 957 and a text display area 960. Upon selecting the BUILD BATCH FILE 950 button, the user is required to input the name of a batch file into text input box 957. A list of test vector files that may be included in the batch file is displayed in text display area 960. Upon test replay completion, a test report will be created. The Replay Control Panel provides status whether testing is idle, in-progress or completed. Selecting the LOAD BATCH FILE 955 button will display the LOAD BATCH FILE Panel 970. Panel 970 includes a scroll down menu 975 of batch file name directories 980. Selection of a directory 980 will populate a file name text display area 982 from which the user can select a batch file name to load for execution in the autotest mode upon the selection of the Load 984 button or reject the selected file name by choosing the Cancel 986 button.

Figure 39:
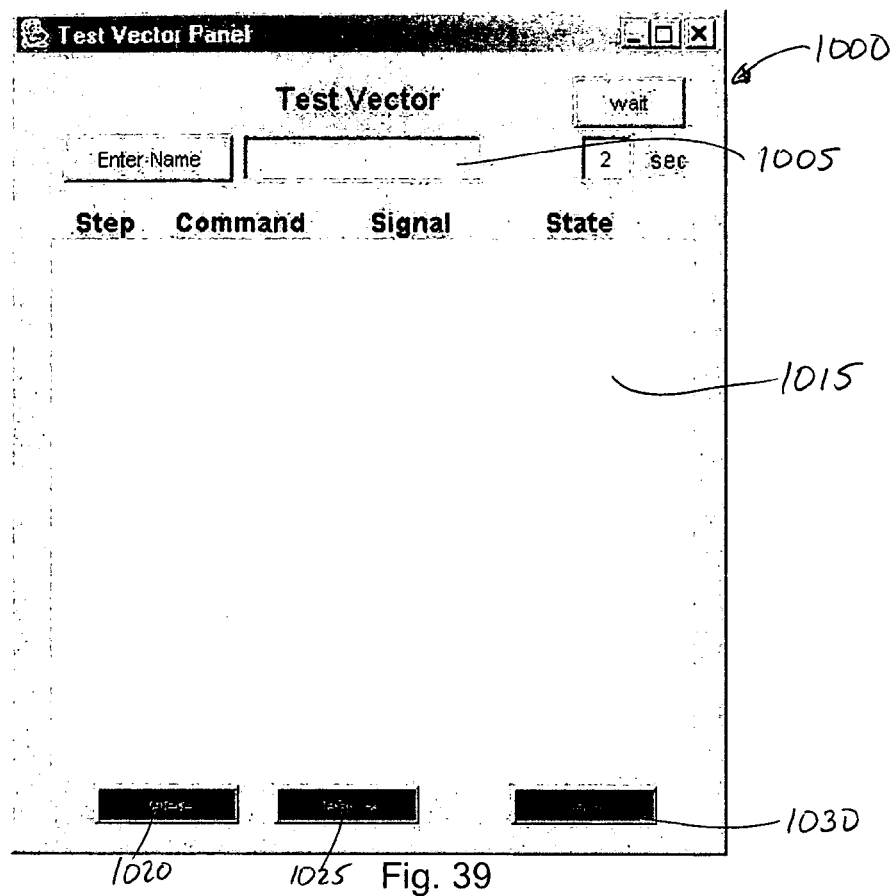
FIG. 39 is an illustration of a Test Vector Control Panel.

In the exemplary embodiment depicted in FIG. 36, selection of the MANUAL 905 button starts manual testing. Selection of the RECORD 910 button will display the Test Vector Panel 1000 for entry of test vector name in text entry field 1005 as illustrated in FIG. 39. Test Vector Panel includes a Test Vector Panel text display area 1015. Test steps are recorded with the Test Vector Panel 1000 displayed with the steps echoed in the Test Vector Panel display area 1015. Test Vector Panel includes a Delete button 1020 which can be selected to delete a test step after highlighting it in the Test Vector Panel text display area 1015. Test Vector Panel Clear button 1025 is provided to allow the user to clear the text displayed in display area 1015. The Test Vector Panel 1000 also includes a Test Vector Panel Save button 1030 that allows the user to save the displayed test step in the test vector. A second text input area 1035 and associated Wait button 1040 allows the user the option of entering a delay time and inputting it by selecting the Wait button 1040.

Figure 40:
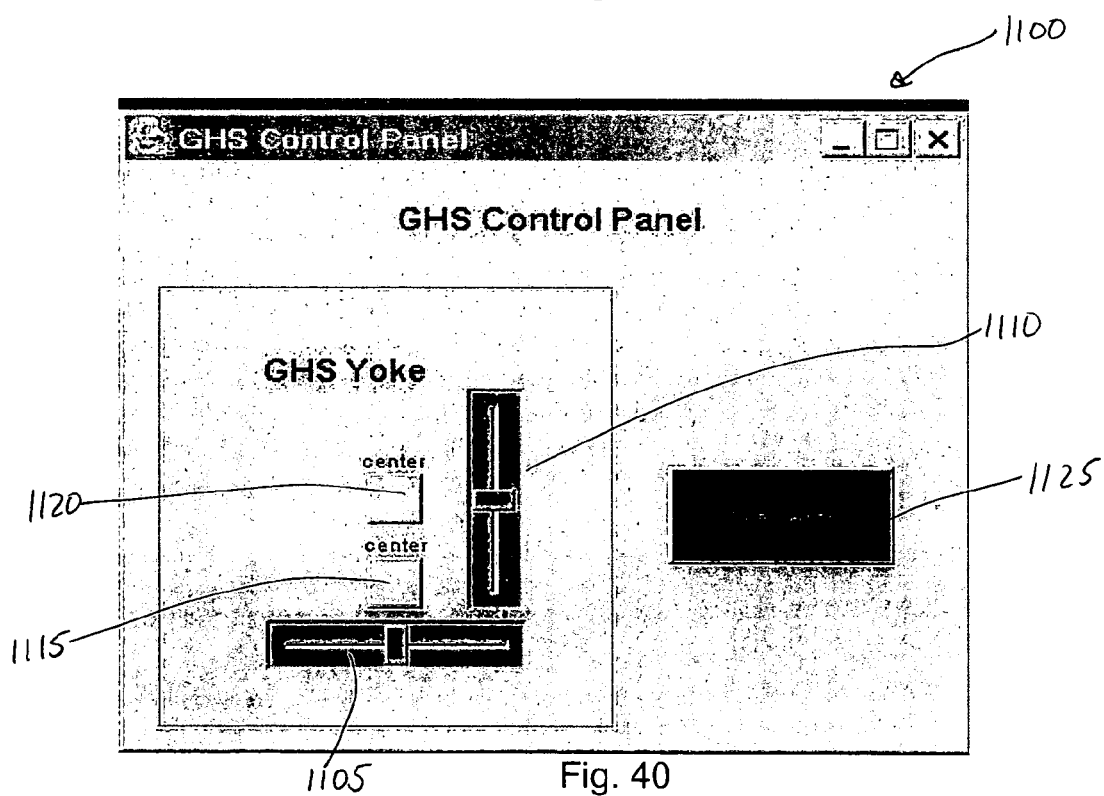
FIG. 40 is an illustration of a GHS Control Panel.
Figure 41:
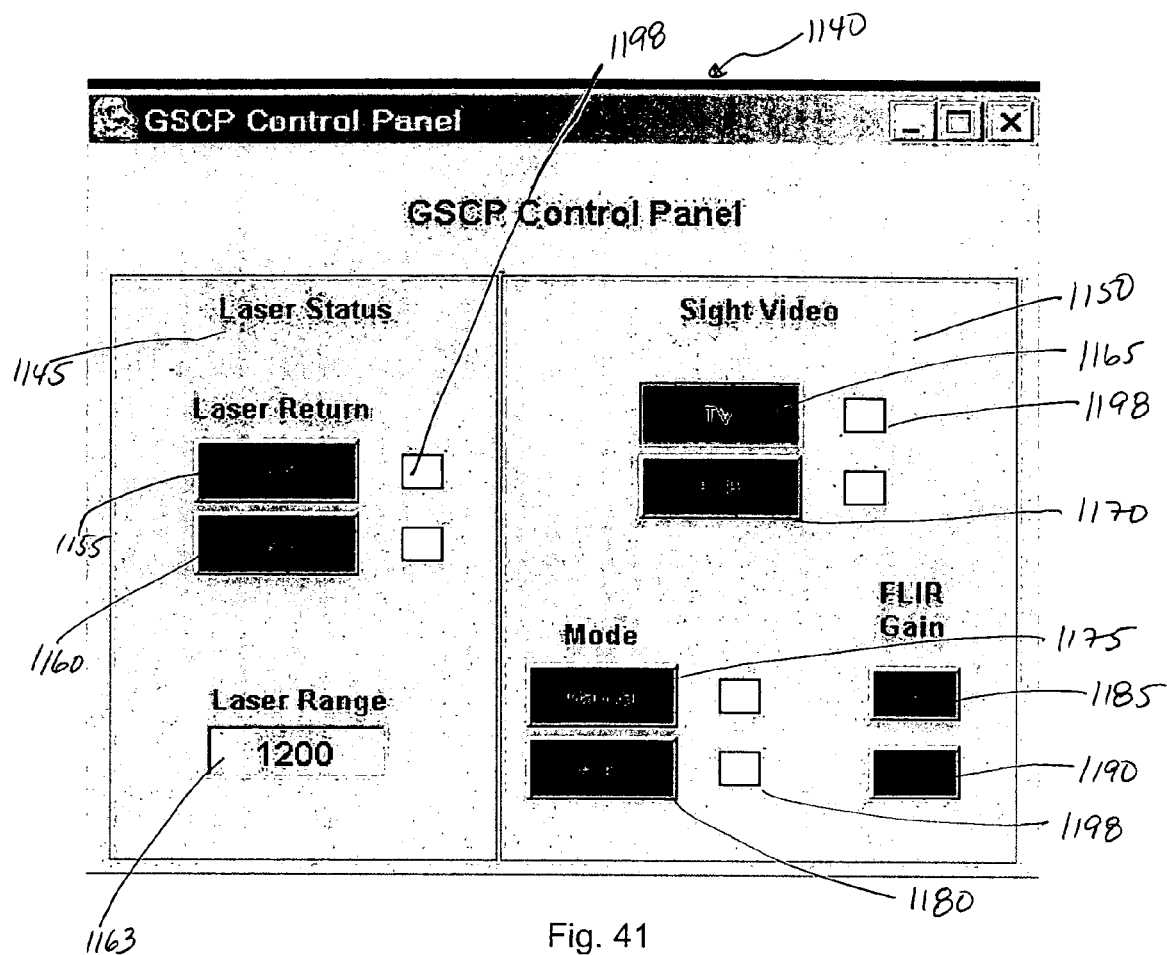
FIG. 41 is an illustration of a GSCP Control Panel.
Figure 42:
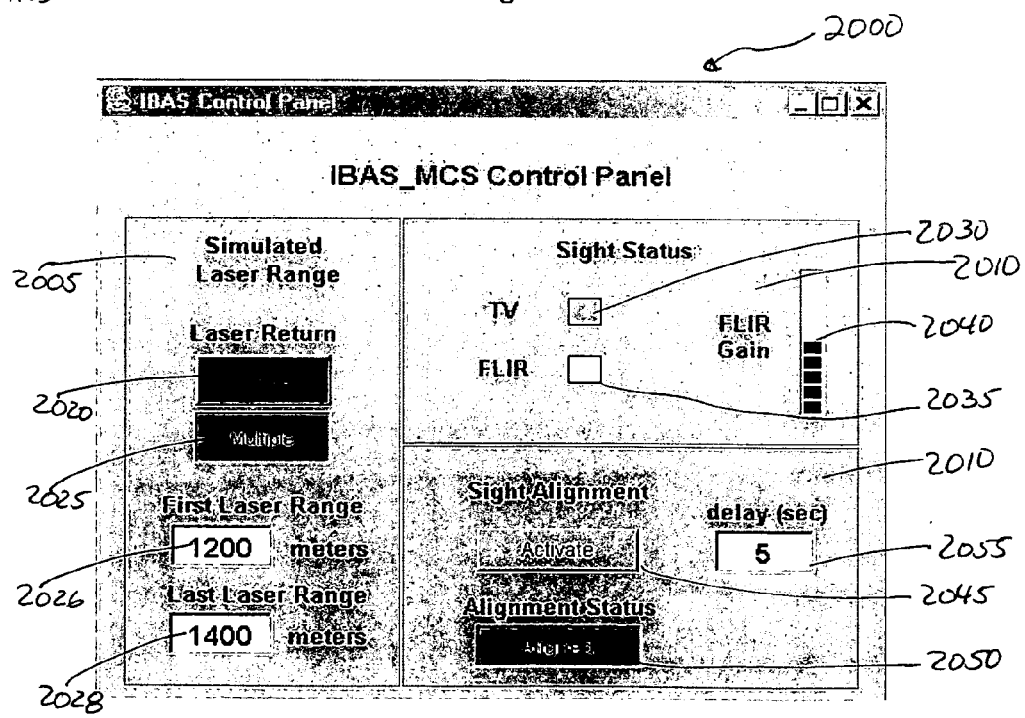
FIG. 42 is an illustration of a IBAS_MCS Control Panel.

Continuing the above example, reference is made to FIG. 36 where shown is the M/R Control Panel 880 of FIG. 36. One of the options presented to the tester in the M/R Control Panel 880 of FIG. 36 is the selection of one or more Simulated Subsystems 145 of the STE using buttons 915 in the Simulated Subsystems menu field 900. The exemplary embodiment of FIG. 36 allows the user a choice of one or more of three Simulated Subsystems—GHS 920, GSCP 922 and IBAS_MCS 924. Selecting a Simulated Subsystem 145 will cause the display of a subsystem panel 855 that corresponds to the selected Simulated Subsystem 145. The layout of each subsystem panel 855 is adapted to capture user input and output information according to the particular information flow needs of the Simulated Subsystem 145 associated with the subsystem panel 855. It will be appreciated that the present invention is not limited by the layout or method of operation of the particular subsystem panel 855. In the exemplary embodiment illustrated in FIGS. 35-42, user selection of the GHS 920 Simulated Subsystem causes the GHS Control Panel 1100 to display as depicted in FIG. 40. GHS Control Panel 1100 includes a first slider element 1105 and a second slider element 1110 useful for continuously varying a GHS 920 related parameter. First and second "Center" buttons 1115 and 1120 allow the tester to automatically center the first and second slider elements 1105 and 1110 respectively. A FIRE LASER button 1125 maybe used to activate an associated "fire laser" command to the GHS 920 Simulated Subsystem. FIG. 41 illustrates the GSCP Control Panel 1140 that results on selecting the GSCP 922 Simulated Subsystem. The GSCP Control Panel 1140 includes a Laser Status menu section 1145 and a Sight Video menu section 1150. The Laser Status menu section 1145 includes Laser Return buttons Laser Return First 1155 and Laser Return Last 1160. A Laser Range text input area 1163 provides the tester to input numeric input to specify a laser range. The Sight Video menu section 1150 provides the tester radio buttons to select between the TV Mode 1165 or the FLIR Mode 1170, between Manual 1175 and Auto 1180 Modes and between a "+" FLIR Gain 1185 and a "−" FLIR Gain 1190. Each of these buttons may be associated with an indicator button 1198 that provides a visual indicia, such as for example a color or a light output, whenever the corresponding input button is selected. FIG. 42 depicts the IBAS_MCS Control Panel 2000. IBAS-MCS Control Panel 2000 includes a Simulated Laser Range menu area 2005, a Sight Status menu area 2010 and a general input menu area 2015. The Simulated Laser Range menu area 2005 provides radio buttons to select between Laser Range Single 2020 and Laser Range Multiple 2025. First Laser Range text input 2026 and Last Laser Range text input 2028 facilitate user input of a numeric range. The Sight Status menu area 2010 has a TV indicator 2030, a FLIR indicator 2035 which provide a visual indicia to indicate that one of the TV Mode 1165 or the FLIR Mode 1170 is active. A FLIR level indicator 2040 provides varying indicia to indicate the level of FLIR Gain 1185 and 1190. The general input menu area 2010 is adapted to provide a Sight Alignment Activate button 2045, an Alignment Status button 2050 and a IBAS_MCS_Control Panel delay input area 2055 to accept tester input of a numeric value of the delay in seconds.

An exemplary method for software regression testing using the STE 120 of the present invention will next be described with reference to the Module flow diagram of FIG. 5. In the first step, the user runs the STE executable (STE.exe) 460 to cause initialization of the STE 120. GUI panel 215 provides the means for the user to interact with the STE 120. FIG. 34 illustrates the GUI panel 215 hierarchy to which each of the Control Panels discussed below belong. As depicted in FIG. 35, the STE Main Control Panel 865 is displayed upon initialization of the STE 120.

The second step, the user selects a test mode. The selection of the manual and/or the record test mode is done from the STE Main Control Panel 865 display by selecting MANUAL/RECORD mode 872 button. FIG. 36 depicts the MANUAL/RECORD (M/R) Control Panel 880 that displays upon the manual and/or the record mode being selected. The M/R Control Panel 880 is adapted to allow the user the choice of activating the RECORD mode in conjunction with the choice of the MANUAL mode. The M/R Control Panel 880 is also adapted to allow the user the choice of selecting one or more Simulated Subsystems 145. Each Simulated Subsystem 145 has associated with it a Subsystem Control Panel that displays upon the users' selection of the particular Simulated Subsystem. Each Simulated Subsystem Control Panel ("Component Panel") presents the user with a menu of commands. The user makes a selection of one or more commands by interacting with the GUI 215. These commands from the Component Panel represent discrete signal commands. The Simulated Subsystem commands and responses are described in the subsystem Interface Control Documents (ICD). The STE 120 checks the subsystem ICD to determine the MIL-STD-1553B formatted message corresponding to the command. The STE 120 executing on the test computer 105 communicates with the CVS 125 running on the application computer 110 via an external Ethernet interface 115. If both the STE 120 and Vehicle Software 125 are running on the same platform, the communication is by means of an internal Ethernet interface utilizing common operating system services. The Ethernet interface between the STE 120 and the Vehicle Software 125 consists of distinct socket numbers for each Simulated Subsystem 145. The data objects transmitted between the STE 120 and the Vehicle Software 125 include Ethernet messages, remote terminal addresses, subaddresses, data words, Simulated Subsystem ICD data words, discrete signal commands and discrete signal responses. Each Ethernet message that passes between the STE 120 and the CVS 125 contains 40 words representing a header (4 words), a remote terminal address (1 word), a subaddress (1 word), data words (1-32 words), and a checksum (2 words). The translator 210 encodes the MIL-STD-1553B formatted message from the Component Panel into a TCP/IP message and forwards it to the Vehicle Software 125. If the RECORD mode has been activated in conjunction with the MANUAL mode, the STE 120 opens a Test vector file and writes the discrete signal, the MIL-STD-155B message and other relevant information into the Test vector file. The Vehicle Software 125 responds with a MIL-STD-1553B formatted command response. The Translator 210 uses the ICD to decode the message and identify a response message to the Vehicle Software 125. The response message is encoded using the ICD and sent to the Vehicle Software. The response may also be sent to the Component Panel for display and recorded into the Test Vector if the RECORD mode is active. The Test Vector also records the delay in the file. If the REPLAY mode is selected on the STE MAIN Control Panel instead of the MANUAL/RECORD mode, the STE 120 runs in an auto test mode wherein it runs a test case by stimulating the Vehicle Software 125 by replaying the commands recorded in one or more Test Vector files contained in a batch file. In an alternate embodiment of the present invention, the test results are received by the Test Vector files and compared with the expected results which, in one embodiment of the present invention are the results recorded in the Test Vector file from an earlier manually or automatically run test case. The test result may comprise, for example, the responses from the vehicle software to the subsystem stimulating the vehicle software as well as to other subsystems that cooperate to perform a task, commands from other subsystems in response to commands from the vehicle software as well as delays between issuance of a command and receipt of a response or between issuance of a command and the occurrence of an event in response to the issued command. Alternately, a test case could be repeated for different parametric settings of the CVS 125 and/or the subsystem 145. The REPLAY Module generates a test output report based upon the test results.

It will be apparent to one of skill in the art that various other analyses might be performed based upon the differences between expected (previously recorded) responses and the test results obtained. The existence or use of such analyses does not limit the present invention.

FIG. 35-42 will be used next to illustrate program flows of the steps performed by the STE 120 to conduct software regression testing of Vehicle Software 125 in accordance with exemplary embodiments of the present invention. The first exemplary embodiment illustrates the program flow of the steps performed by the STE 120 in software regression testing of the CVS 125 where the CVS 125 is tasked with the selection of the last target range. The user runs the STE executable (STE.exe) 460 to initialize the STE 120. Upon initialization of the STE 120, the STE Main Control Panel 865 is displayed as illustrated in FIG. 35. To initiate MANUAL software regression testing of the CVS 125, the user selects the MANUAL/RECORD mode 872 button which causes the MANUAL/RECORD (M/R) Control Panel 880 illustrated in FIG. 36 to display. Next, the user selects the MANUAL button 905 to start manual testing and follows up by selecting the GSCP button 922 to display the GSCP Control Panel 1140. As noted in Table 29 above, the GSCP is the acronym for Gunner's Sight Control Panel (GSCP) 922, which provides the selections for adjusting the IBAS binocular and the video image for the gunner's sight. Full functionality of the GSCP will be simulated. As also noted in Table 29, IBAS is the acronym for The Improved Bradley Acquisition Subsystem (IBAS) that consists of the Target Acquisition Subsystem (TAS), the Missile Control Subsystem (MCS) and the Second Generation Common Electronics Unit (SGCEU). The user selects the LAST button 1160 to simulate an operator input to select the Last Laser Return. The operator Last Laser Return selection is encoded into the MIL-STD-1553 format as per the GSCP Interface Control Document (ICD) 482 and sent to the Translator Module 210. The Translator Module 210 converts the MIL-STD-1553 formatted data into TCP/IP data packets, which are transmitted to stimulate the Vehicle Software 125 as described in connection with the illustration of FIG. 6. If the user activated the RECORD mode 910 concurrently with the selection of the MANUAL mode 905 in the MANUAL/RECORD (M/R) Control Panel 880, the MIL-STD-1553 format encoded operator Last Laser Return selection is sent to the Translator Module 210 as well as the RECORD/REPLAY Module 25 for recording. The STE creates a Test Vector File 485, parses the user command into a signal name and records both the command and the signal name into the Test Vector File 485 as illustrated in Table 34 above. The Vehicle Software 125 responds by sending a command to the IBAS-MCS 924 to select the Last Laser Return. The Last Laser Return command from the Vehicle Software 125 to the IBAS-MCS 924, is encoded into the MIL-STD-1553 format by the Translator Module 210 using the ICD 482 of the IBAS-MCS 924. The IBAS-MCS 924 will provide Last Laser Return is selected to the Vehicle Software 125. The Vehicle Software 125 will command the GSCP in the STE to turn on the Last Return selected indicator 1198 corresponding to the Last Laser Return button 1160. If the RECORD mode 910 has been selected, the STE parses the Last Laser Return command from the Vehicle Software 125 into a signal name and records both the MIL-STD-1553 format encoded command and the signal name into the Test Vector File 485 as illustrated in Table 34 above.

The second exemplary embodiment illustrates the program flow of the steps performed by the STE 120 in software regression testing of the CVS 125 where the CVS 125 is tasked with the activation of the laser range finder for the return range of selected last target following the selection of the last target range. The user performs all the steps described in connection with the first exemplary embodiment above except for selecting the ALL button 930 instead of selecting the GSCP button 922. This action causes the display of the GHS Control Panel 1100 and the IBAS_MCS Control Panel 2000 in addition to the GSCP Control Panel 1140 and results in the CVS 125 commanding the selection of the last target range as indicated by the turned on status of the Last Return selected indicator 1198 on the GSCP in the STE 120. The user inputs a numeric value, for example 1400 meters, in the Last Laser Range text input 2028 of the IBAS_MCS Control Panel 2000. Next the user activates FIRE LASER button 1125 in the GHS Control Panel 1100. The operator FIRE LASER selection is encoded into the MIL-STD-1553 format as per the GHS Interface Control Document (ICD) 482 and sent to the Translator Module 210. The Translator Module 210 converts the MIL-STD-1553 formatted data into TCP/IP data packets, which are transmitted to stimulate the Vehicle Software 125 as described in connection with the illustration of FIG. 6. The Vehicle Software 125 sends the Fire Laser command to the STE (IBAS_MCS). The Fire Laser command from the Vehicle Software 125 to the IBAS-MCS 924, is encoded into the MIL-STD-1553 format by the Translator Module 210 using the ICD 482 of the IBAS-MCS 924. The IBAS-MCS 924 will provide the Last Laser Range Value 2028 to the Vehicle Software125. If the RECORD mode 910 has been selected, the STE parses the Fire Laser command from the Vehicle Software 125 into a signal name and records both the MIL-STD-1553 format encoded command and the signal name into the Test Vector File 485 as illustrated in Table 34 above.

The third exemplary embodiment illustrates the program flow of the steps performed by the STE 120 in software regression testing of the CVS 125 where the CVS 125 is tasked with adjustment (increase or decrease) of the sight (IBAS_MCS) video gain level. The user runs the STE executable (STE.exe) 460 to initialize the STE 120. Upon initialization of the STE, the STE Main Control Panel 865 is displayed as illustrated in FIG. 35. To initiate MANUAL software regression testing of the CVS 125, the user selects the MANUAL/RECORD mode 872 button which causes the MANUAL/RECORD (M/R) Control Panel 880 illustrated in FIG. 36 to display. Next, the user selects the MANUAL button 905 to start manual testing and follows the selection by selecting the GSCP button 922 to display the GSCP Control Panel 1140 and selecting the IBAS_MCS button 924 to display the IBAS-MCS Control panel 2000. On the GSCP Control Panel 1140, the user selects MANUAL MODE by selecting button 1175 and the FLIR Sight Video button 1170. The STE (GSCP) sends the FLIR select to the Vehicle Software 125. The CVS 125 sends FLIR select to the STE (IBAS_MCS). The STE 120 (IBAS_MCS) displays FLIR by lighting the indicator 1198 associated with the FLIR button 1170 on the IBAS_MCS Control Panel. The user selects FLIR GAIN+button 1185 on the IBAS_MCS Control Panel. The STE 120 (GSCP) sends the FLIR Gain+select status to the CVS 125. The CVS 125 sends the FLIR Gain+command to the STE (IBAS_MCS) if FLIR is selected. If the RECORD mode 910 has been selected, the STE 120 parses all commands to and from the Vehicle Software 125 into a signal name and records both the MIL-STD-1553 format encoded command and the signal name into the Test Vector File 485 as illustrated in Table 34 above. In each of the above cases, the test file may be used to run an auto test case and test results recorded to support automated testing and validation of the vehicle software logic.

It should be appreciated that various modifications may be made to the illustrated embodiments without departing from the scope of the present invention. Therefore, the scope of the invention is defined only by the claims appended hereto.

What is claimed is:

1. A verification system for combat vehicle software application comprising:

A first processor communicatively coupled to at least one combat vehicle software application (CVSA) and a second operating system environment;

a second processor communicatively coupled to a set of extensible simulation primitives and a second operating system environment;

a CVSA configured for operation on the first processor under the first operating system environment, the CVSA communicatively coupled to and configured for communication with a plurality of combat vehicle subsystems (CVSUB)s by exchanging a plurality of messages according to a first predefined protocol, each CVSUB characterized by at least one expected behavior triggered responsive to an exchange of at least one of the plurality of messages with the CVSA, wherein the CVSA is operative to generate at least a first event representing a resultant of one or more interdependent expected behaviors of a first plurality of CVSUBs triggered responsive to the exchange, between the CVSA and the first plurality of CVSUBs, of a first ordered sequence of messages from among the plurality of messages;

a set of extensible simulation primitives comprising computer executable instructions suitable for execution on the second processor under the second operating system environment, the set of extensible simulation primitives designed so that at least one subset of extensible simulation primitives is capable of cooperating to simulate the at least one expected behavior of a selected CVSUB from among the plurality of CVSUBS;

a plurality of simulated subsystems (SIMSUB)s corresponding to the plurality of CVSUIBs, each SIMSUB comprising the at least one subset of extensible simulation primitives capable of cooperating to simulate the at least one expected behavior of the CVSUB that corresponds to the SIMSUB by exchanging the at least one of the plurality of messages with the CVSA sufficient to trigger the at least one expected behavior of the CVSUB;

a graphical user interface (GUI) comprising at least one GUI panel corresponding to each of the SIMSUBs, each GUI panel associated with a selected SIMSUB adapted to enable a user to inject input to and receive output from the selected SIMSUB wherein the input and the output affect the generation of the first event;

a record-replay module executing on the second processor and communicatively coupled to the first plurality of SIMSUBs to selectively store the injected input and the received output from each GUI panel associated with the first plurality of SIMSUBs involved in the exchange of the first ordered sequence of messages with the CVSA in a test vector file, and responsive to user input, replay the test vector file to recreate the exchange of the first ordered sequence of messages between the first plurality of SIMSUBs and an altered CVSA, the record-play module comprising:
  a test vector file accessible using the second processor, the test vector file configured to store the injected input and the received output from each GUI panel associated with the first plurality of SIMSUBs involved in the exchange of the first ordered sequence of messages with the CVSA to affect generation of the first event by the CVSA; and
  seven components, wherein each component includes computer executable code defining a logic structure, and wherein:
    the first component is configured with indicia to indicate and confirm activation of a RECORD mode and to open the test vector file responsive to the RECORD mode being activated;
    the second component is configured with storage logic to cause storage of the injected input and the received output in the test vector file;
    the third component is configured with indicators to indicate and confirm activation of a REPLAY mode;
    the fourth component is provided with an array, the fourth component operative to retrieve the test vector file in which the second component has stored the injected input and transfer the received output as entries in the array before transferring the array to the fifth component;
    the fifth component configured with control logic adapted to send the received output received from the fourth component to a comparator module;
    the sixth component configured with analysis logic adapted to compare the entries in the array received from the fourth component with the responses received from the SSM to determine a whether a disagreement indicative of a regression failure exists, generate pass/fail results for the test file based on the existence of a disagreement, and store the entries of the array; and
    the seventh component configured with report logic adapted to generate a report using the pass/fail results from the sixth component; and
  a comparator module communicating with the record-replay module and the GUI, the comparator module operative to capture and dynamically compare the received output from the attempted regeneration of the first event using the altered CVSA to the received output from the generation of the first event by the unaltered CVSA and output indicia indicative of each disagreement between the two;
wherein a user interfacing with the GUI selectively controls the operation of the verification system in a first operating system environment to selectively perform the regression testing of the CVSA operating in a second operating system environment by simulating external CVSUBs and selectively recording and replaying simulated subsystem commands and subsystem responses to generate a pass/fail report from the comparator module to indicate the results of the regression test on the CVSA.

2. The system of claim 1 wherein the set of extensible simulation primitives comprises at least one command primitive, at least one behavior primitive and at least one response primitive wherein the at least one command primitive is configured to receive a command signal from the CVSA, the at least one behavior primitive is configured to simulate the at least one expected behavior of the CVSUB responsive to the at least one command signal and the at least one response primitive is configured to output a response signal generated responsive to the at least one expected behavior.

3. The system of claim 2 further including a bi-directional data bus to communicatively couple the CVSA with the plurality of SIMSUBs for transferring the plurality of messages exchanged between the CVSA and the SIMSUBs.

4. The system of claim 3 wherein each message in the plurality of messages communicated over the bi-directional bus is a TCP/IP packet.

5. The system of claim 4 wherein the set of extensible simulation primitives further includes a translator primitive, the translator primitive interoperable with the CVSA and the SIMSUBs to translate messages between MIL-STD-1553 and TCP/IP wherein the TCP/IP protocol is utilized during transfer of messages over the bi-directional bus.

6. The system of claim 4 further comprising an interface control document (ICD) having information to enable translation of the command signal and the response signal from the MIL-STD-1553 to the TCP/IP communication protocols for transmission on the bi-directional data bus and from the TCP/IP to the MIL-STD-1553 protocol for processing using the first and the second processor.

7. The system of claim 1 wherein the computer executable instructions are coded using JAVA.

8. The system of claim 1 wherein the first predefined protocol is MIL-STD-1553.

9. The system of claim 1 further comprising at least one table based description specifying a relationship between the command signal from the CVSA, the at least one expected behavior of the CVSUB responsive to the command signal and the response signal generated responsive to the at least one expected behavior.

10. The system of claim 1 wherein the at least one expected behavior simulated by the behavior primitive is selected from the group consisting of PASS-THROUGH, INCREMENT, TOGGLE, and GUI-INPUT.

11. The system of claim 1 wherein the CVSUBs are selected from the group consisting of an Improved Bradley Acquisition Subsystem (IBAS), a Gunner's Sight Control Panel (GSCP) and a Gunner's Hand Station (GHS).

12. The system of claim 1 wherein the disagreement between the received output from the attempted regeneration of the first event using the altered CVSA and the received output from the generation of the first event by the unaltered CVSA includes a time delay between an initiation of the command signal and the receipt of the respective output from the attempted regeneration of the first event using the altered CVSA and from the generation of the first event by the unaltered CVSA.

13. A software test environment (STE) for conducting a regression test of a combat vehicle software application (CVSA) running on a first processor under a first operating system environment, the CVSA configured to interact with combat vehicle software subsystems applications (CVSUBAs) by encoded messages communicated over a data bus to generate a set of events, each event resulting from an interaction of one or more CVSUBAs with the CVSA, the STE comprising:
  a first processor communicatively coupled to a CVSA and a first operating system environment;
  a second processor communicatively coupled to one or more simulated system modules (SSMs);
  a simulated subsystem module (SSM) having computer readable instructions defining a separate logic structure for each of the CVSUBAs, the logic structures configured for operation on the second processor under a second operating system environment wherein each separate logic structure simulates at least one operation of at least one of the CVSUBAs, wherein a first event results from one or more simulated operations representing the interaction of the at least one CVSUBA or a combination of CVSUBAs with the CVSA using a first set of electronic message interchanges;

a bi-directional communication link communicatively coupled to the first and second processors to allow an exchange of electronic messages between the CVSA and the SSM using a predetermined communications protocol;

a translator module coupled intermediate the bi-directional communication link and each of the first and second processors, the translator module configured to provide a communication interface between the CVSA and the SSM;

a graphical user interface (GUI) coupled to the SSM and having a plurality of control panels for data input so as to initiate and to continue the generation of the first event;

a record-replay module communicatively coupled to the SSM to selectively store the electronic message interchanges associated with the generation of the first event in a first test file and responsive to user input, replay the first test file to selectively supply at least one of the first set of electronic message interchanges stored therein to the SSM, in lieu of the data input, to attempt to initiate and automatically continue the generation of the first event, the record-replay module effective to dynamically compare the resulting second set of electronic message interactions with the first set of electronic message interactions to determine a disagreement between them wherein the disagreement is indicative of the CVSA failing the regression test, the record-play module comprising:

a first test file comprising the electronic message interchanges that include subsystem commands and subsystem responses; and seven components, wherein each component includes computer executable code defining a logic structure, and wherein:

the first component is configured with indicia to indicate and confirm activation of a RECORD mode and to open the at least one test file responsive to the RECORD mode being activated;

the second component is configured with storage logic to cause storage of the subsystem commands and subsystem responses in the test file;

the third component is configured with indicators to indicate and confirm activation of a REPLAY mode;

the fourth component is provided with an array, the fourth component operative to retrieve the test file in which the second component has stored the simulated subsystem commands and subsystem responses and transfer the stored subsystem commands and subsystem responses as entries in the array before transferring the array to the fifth and the sixth component;

the fifth component configured with control logic adapted to send the stored subsystem commands and subsystem responses received from the fourth component to the SSM;

the sixth component configured with analysis logic adapted to compare the entries in the array received from the fourth component with the responses received from the SSM to determine a whether a disagreement indicative of a regression failure exists, generate pass/fail results for the test file based on the existence of a disagreement, and store the entries of the array; and the seventh component configured with report logic adapted to generate a report using the pass/fail results from the sixth component; and wherein a user interfacing with the GUI selectively controls the operation of the STE in a first operating system environment to selectively perform the regression testing of the CVSA operating in a second operating system environment by simulating external combat vehicle subsystems and selectively recording and replaying simulated subsystem commands and subsystem responses to generate a pass/fail report to indicate the results of the regression test on the CVSA.

14. The software test environment (STE) of claim 13 wherein the simulated subsystem module (SSM) comprises:

a first component, a second component and a third component, wherein the first component is communicatively coupled to the second component and the second component is communicatively coupled to the third component, wherein:

the first component is placed in data communication with the translator module and operative to send and receive MIL-STD-1553 data to and from the translator communication interface between the CVSA and the SSM;

the second component is placed in data communication with the record-replay module and provided with an interface control document (ICD) associated with each CVSUBA for encoding and decoding MIL-STD-1553 data, the second component operative to send encoded MIL-STD-1553 data to the record-replay module for recording when a RECORD mode is activated and to receive a record-replay input from the record-replay module for encoding into MIL-STD-1553 data before forwarding the record-replay input to the first component; and the third component is placed in data communication with the GUI, and operative to determine a response to a command received from the CVSA based on the ICD and to send the response to the GUI and optionally to the second component for encoding into MIL-STD-1553 data, the third component also configured to receive a gui-input from the GUI and the record-replay input from the record-replay module, determine responses to each of the gui-input and the record-replay input and send the responses to the second component for encoding.

15. The software test environment of claim 13 wherein the GUI comprises first, second, third and fourth components with the first and second components placed in data communication with a tester module, the second component placed in data communication with the third and fourth component, the third and the fourth components placed in data communication with the simulated subsystem (SSM); wherein:

the first component is provided with a first GUI panel for test mode selection from the tester module, the GUI panel provided with display of icons to allow user interaction, the icons selected from the group consisting of toggle switches, radio buttons, user text fields, checkboxes, LEDs and labels;

the second component is provided with a plurality of second GUI panels to allow user selection of a user selected simulated subsystem and to generate at least one stimulus;

the third component is provided with a control panel corresponding to the user selected simulated subsystem, the control panel configured to present GUI objects for user-selection, selected GUI objects translated by the third component into messages and transmitted to the user selected simulated subsystem; and the fourth component is provided with a display panel to display a status of the user selected simulated subsystem by processing the at least one stimulus together with a response generated by the selected simulated subsystem responsive to the at least one stimulus, the display panel having buttons, labels and LEDs to display the status.

16. The system of claim 13 wherein the predetermined communications protocol is TCP/IP.

17. The system of claim 13 further including a tester module having a first component and a second component, the first component communicatively coupled to the GUI and operative to select objects for display on the GUI; and the second component communicatively coupled to the GUI and the record-replay module, the second component operative to select a test mode from the group consisting of the RECORD mode and the REPLAY mode and send the selected test mode to the GUI and the record-replay module.

18. A system for regression testing combat vehicle software application configured for cooperative operation with at least one combat vehicle subsystem, the system comprising:

a first processor operating under the control of a first operating system;

at least one second processor operating under the control of a second operating system;

at least one data store communicatively coupled to at least one of the first and the second processors;

a combat vehicle software application (CVSA) configured to execute on the first processor, the CVSA operative to receive regression testing related information defining at least one stimulus and to selectively generate regression testing related information defining at least one signal command responsive to the at least one stimulus; and at least one reconfigurable logic module including instructions executable on the second processor, the instructions operative to generate regression testing related information defining a signal response responsive to the at least one signal command and regression testing related information defining a time for response, the signal response indicative of a predefined behavior of the at least one combat vehicle subsystem in response to the at least one signal command, the time for response indicative of an anomalous delay between the at least one stimulus and the signal response;

a bi-directional communication link operative to communicatively couple the first and the second processors for transmission of regression testing related information between the combat vehicle software and the at least one reconfigurable logic module;

a translator module configured to interoperate with the bi-directional communication link and the combat vehicle software at the first processor and with the bi-directional communication link and the at least one reconfigurable logic module at the second processor, the translator module operative to reformat regression testing related information for each passage of the regression testing related information to and from the bi-directional communication link;

an input device configured to receive user input and to generate regression testing related information defining an input signal; and a record-replay module in data communication with the at least one reconfigurable logic module and the at least one data store, the record-replay module comprising:

at least one test file that receives the input signal from the input device, including the subsystem commands and subsystem responses; and seven components, wherein each component includes computer executable code defining a logic structure, and wherein:

the first component is configured with indicia to indicate and confirm activation of a RECORD mode and to open the at least one test file responsive to the RECORD mode being activated;

the second component is configured with storage logic to cause storage of the subsystem commands and subsystem responses in the at least one test file;

the third component is configured with indicators to indicate and confirm activation of a REPLAY mode;

the fourth component is provided with an array, the fourth component operative to retrieve the at least one test file in which the second component has stored the simulated subsystem commands and subsystem responses and transfer the stored subsystem commands and subsystem responses as entries in the array before transferring the array to the fifth and the sixth component;

the fifth component configured with control logic adapted to send the stored subsystem commands and subsystem responses received from the fourth component to the SSM;

the sixth component configured with analysis logic adapted to compare the entries in the array received from the fourth component with the responses received from the SSM to determine whether a disagreement indicative of a regression failure exists, generate pass/fail results for the test file based on the existence of a disagreement, and store the entries of the array; and the seventh component configured with report logic adapted to generate a report using the pass/fail results from the sixth component;

such that the record-replay module is operative to record the regression testing related information corresponding to each test case wherein each test case is characterized by the regression testing related information flowing through the system beginning with the regression testing related information defining at least one stimulus and ending with the regression testing related information defining the at least one signal response wherein a difference between regression testing related information corresponding to two test cases is indicative of a regression of the system.

* * * * *